(12) United States Patent
Li et al.

(10) Patent No.: US 12,607,827 B2
(45) Date of Patent: Apr. 21, 2026

(54) OPTICAL IMAGING LENS ASSEMBLY

(71) Applicant: Zhejiang Sunny Optics Co., Ltd., Yuyao City (CN)

(72) Inventors: Yang Li, Yuyao City (CN); Tianxiang Xing, Yuyao City (CN); Lingbo He, Yuyao City (CN); Fujian Dai, Yuyao City (CN); Liefeng Zhao, Yuyao City (CN)

(73) Assignee: Zhejiang Sunny Optics Co., Ltd., Yuyao City (CN)

( * ) Notice: Subject to any disclaimer, the term of this patent is extended or adjusted under 35 U.S.C. 154(b) by 801 days.

(21) Appl. No.: 17/701,128

(22) Filed: Mar. 22, 2022

(65) Prior Publication Data

US 2022/0334354 A1    Oct. 20, 2022

(30) Foreign Application Priority Data

Apr. 15, 2021    (CN) ........................ 202110404494.X

(51) Int. Cl.
| | |
|---|---|
| *G02B 13/00* | (2006.01) |
| *G02B 1/00* | (2006.01) |
| *G02B 3/04* | (2006.01) |
| *G02B 9/62* | (2006.01) |

(52) U.S. Cl.
CPC ................ *G02B 9/62* (2013.01); *G02B 1/00* (2013.01); *G02B 3/04* (2013.01); *G02B 13/0045* (2013.01)

(58) Field of Classification Search
CPC ... G02B 9/62; G02B 1/00; G02B 3/04; G02B 13/0045; G02B 13/18

USPC ......................................................... 359/713
See application file for complete search history.

(56) References Cited

U.S. PATENT DOCUMENTS

| | | | | |
|---|---|---|---|---|
| 8,379,323 | B2 * | 2/2013 | Huang | G02B 13/0045 |
| | | | | 359/740 |
| 9,448,385 | B2 * | 9/2016 | Hsu | G02B 13/18 |
| 9,575,291 | B2 * | 2/2017 | Noda | G02B 9/62 |
| 2015/0338616 | A1 * | 11/2015 | Hsu | G02B 9/62 |
| | | | | 359/713 |
| 2017/0315334 | A1 * | 11/2017 | Liao | G02B 9/62 |
| 2018/0024326 | A1 * | 1/2018 | Teraoka | G02B 9/62 |
| | | | | 359/713 |

(Continued)

FOREIGN PATENT DOCUMENTS

| | | |
|---|---|---|
| CN | 108490588 A | 9/2018 |
| CN | 208367314 U | 1/2019 |

(Continued)

*Primary Examiner* — William R Alexander
*Assistant Examiner* — Alaina Marie Swanson
(74) *Attorney, Agent, or Firm* — Sughrue Mion, PLLC

(57) ABSTRACT

The present disclosure discloses an optical imaging lens assembly including, sequentially along an optical axis from an object side to an image side: a stop; a first lens having positive refractive power; a second lens having refractive power; a third lens having negative refractive power; a fourth lens having refractive power; a fifth lens having negative refractive power; and a sixth lens having refractive power and a convex image-side surface. The first to sixth lenses include two glass aspheric lenses. A distance TTL along the optical axis from an object-side surface of the first lens to an image plane of the optical imaging lens assembly and an effective focal length f of the optical imaging lens assembly satisfy: TTL/f<1.0.

20 Claims, 12 Drawing Sheets

(56)  References Cited

U.S. PATENT DOCUMENTS

| 2018/0299647 | A1 | * | 10/2018 | Wu | .................... | G02B 13/0045 |
| 2020/0249445 | A1 | * | 8/2020 | Hu | ......................... | G02B 13/02 |
| 2020/0257091 | A1 | * | 8/2020 | Huang | ................... | G02B 13/02 |

FOREIGN PATENT DOCUMENTS

| CN | 109739012 | A | * | 5/2019 | ......... | G02B 13/0045 |
| CN | 111208623 | A | | 5/2020 | | |
| CN | 111812820 | A | | 10/2020 | | |
| CN | 112198632 | A | | 1/2021 | | |
| CN | 112241060 | A | | 1/2021 | | |
| CN | 112485894 | A | | 3/2021 | | |
| CN | 112505890 | A | | 3/2021 | | |
| CN | 214375534 | U | | 10/2021 | | |
| CN | 113759523 | A | * | 12/2021 | ......... | G02B 13/0045 |
| TW | 201317620 | A | * | 5/2013 | ......... | G02B 13/0045 |

* cited by examiner

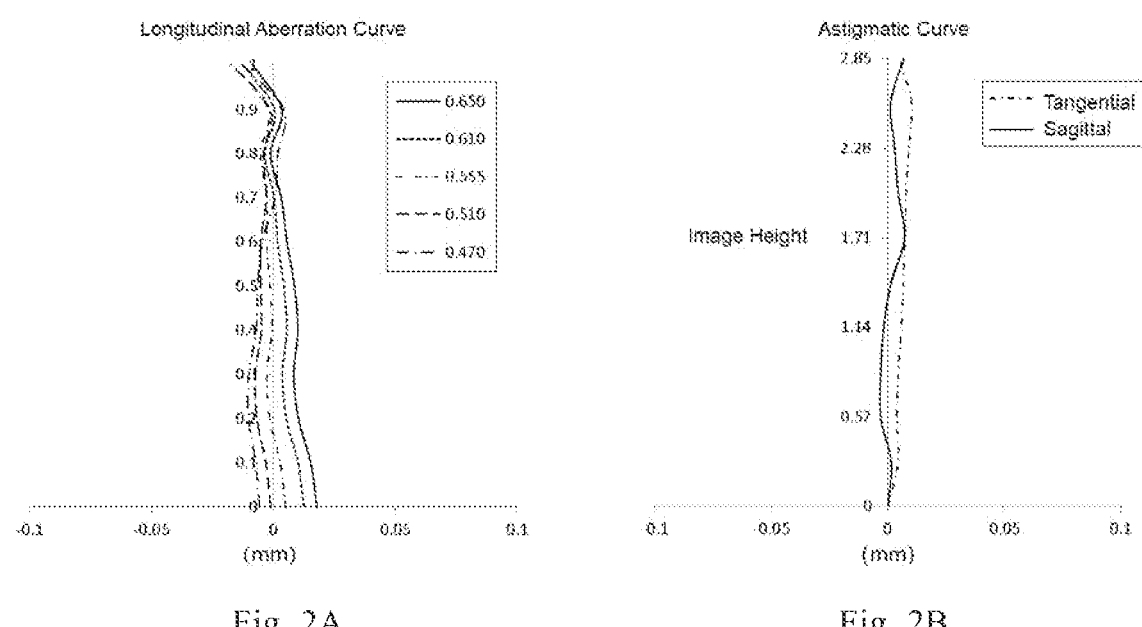
Fig. 2A
Fig. 2B
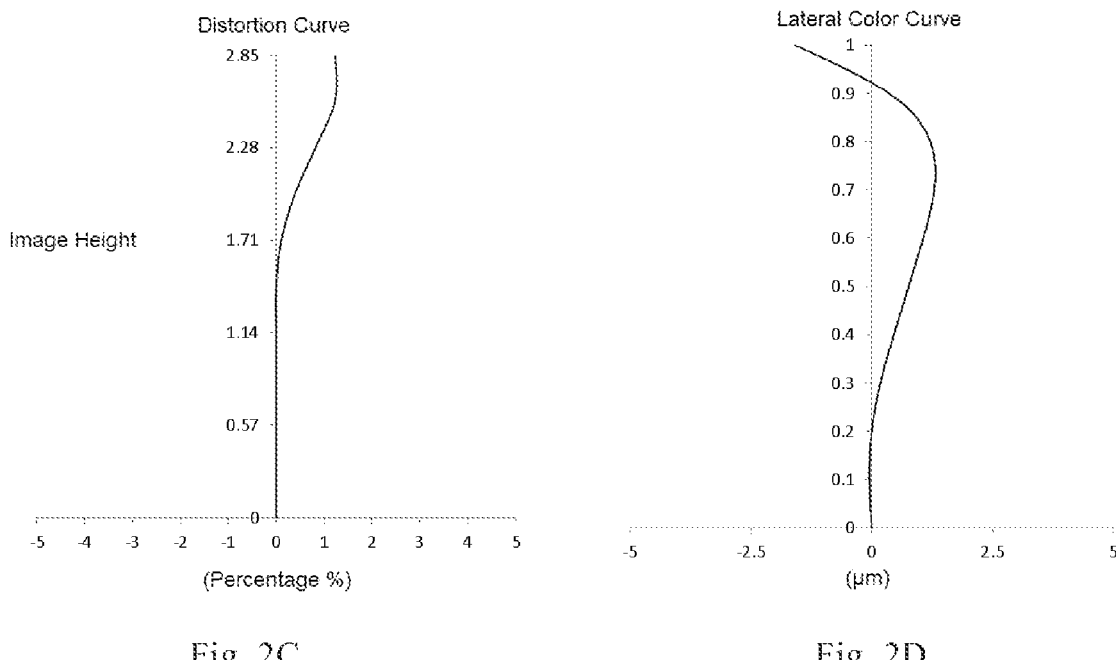
Fig. 2C
Fig. 2D

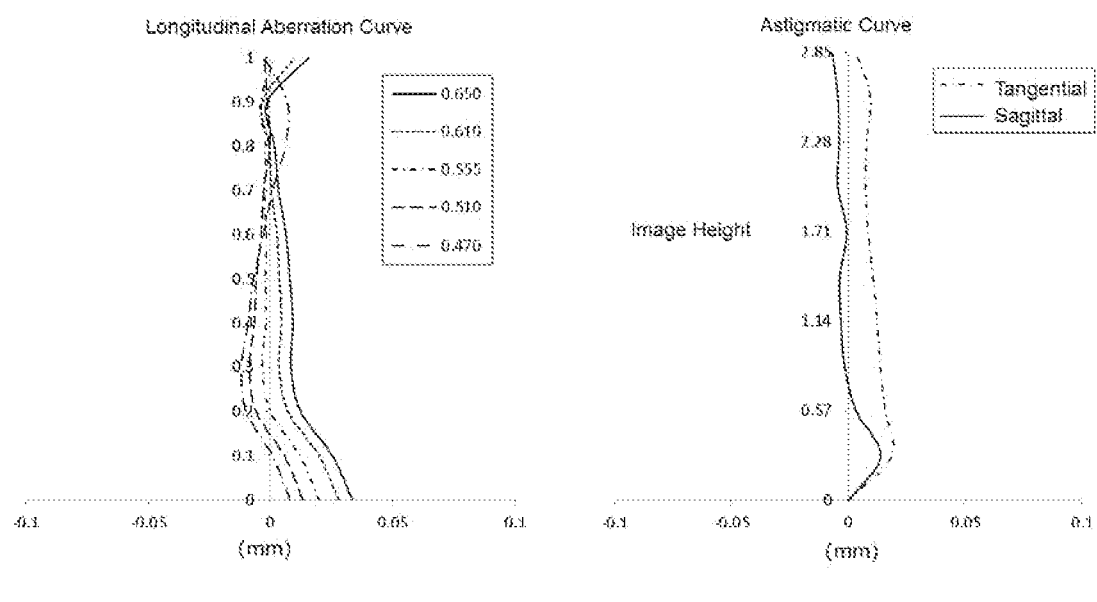
Fig. 4A                              Fig. 4B
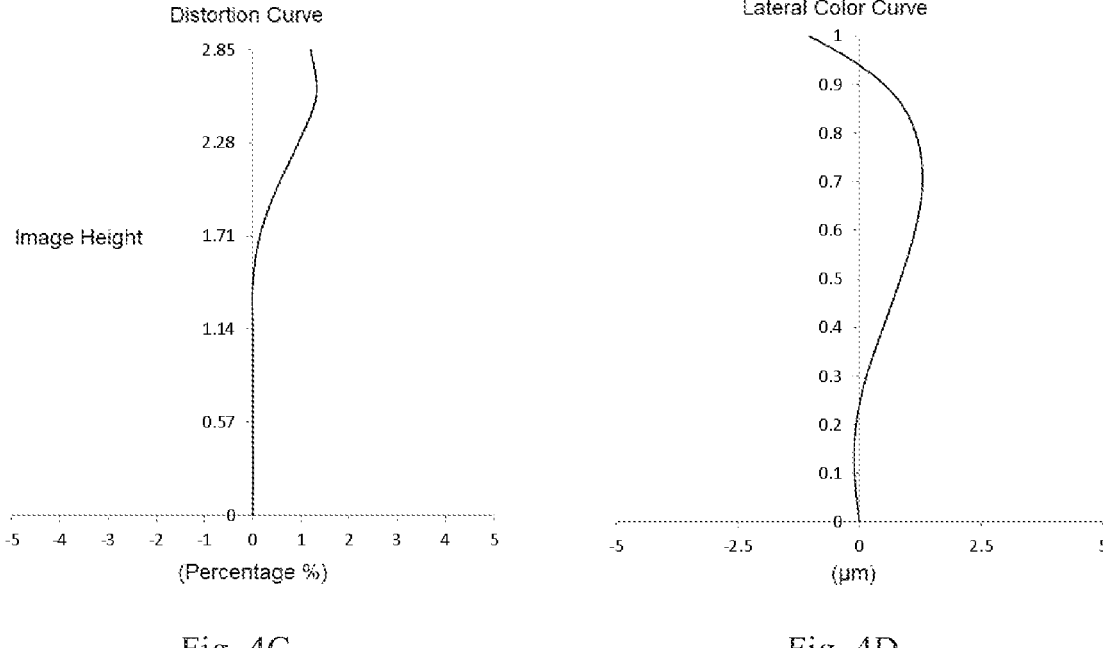
Fig. 4C                              Fig. 4D

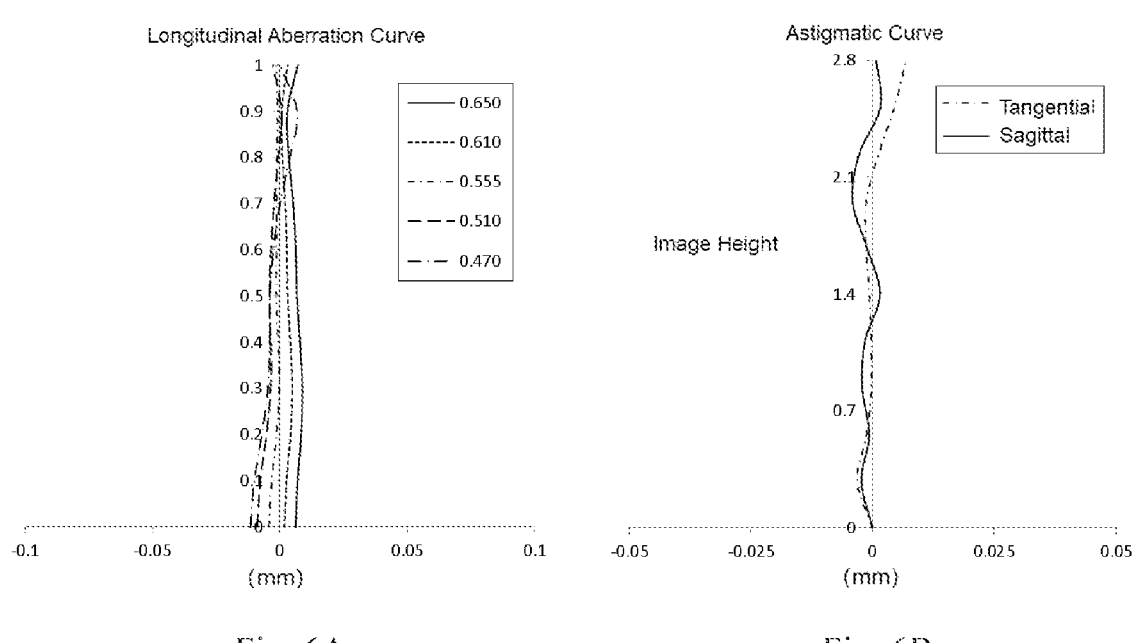
Fig. 6A
Fig. 6B
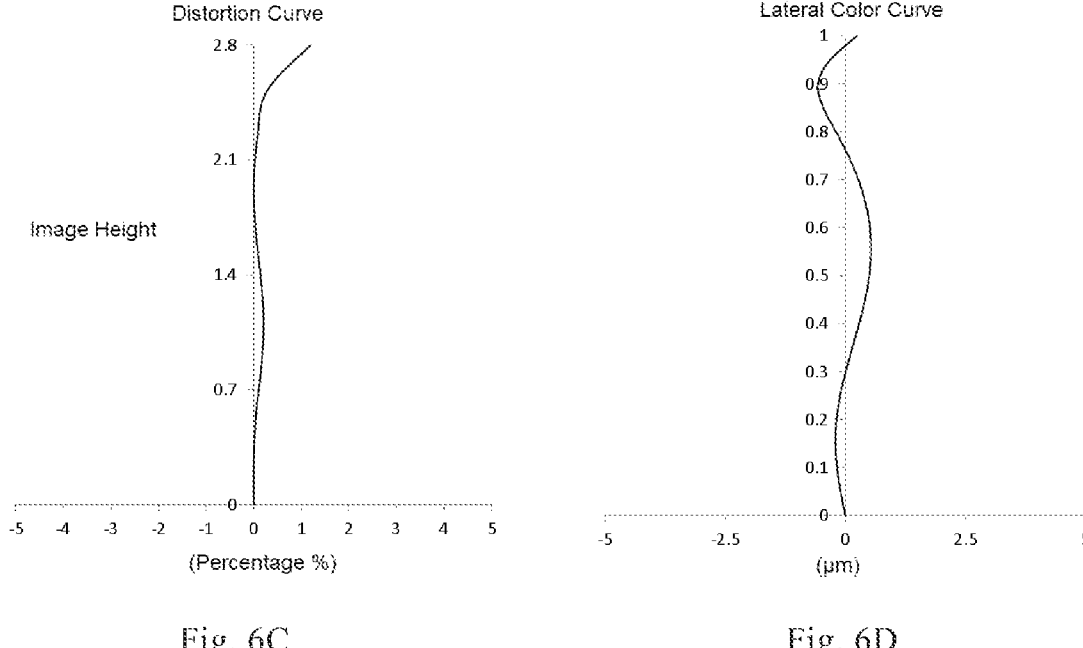
Fig. 6C
Fig. 6D

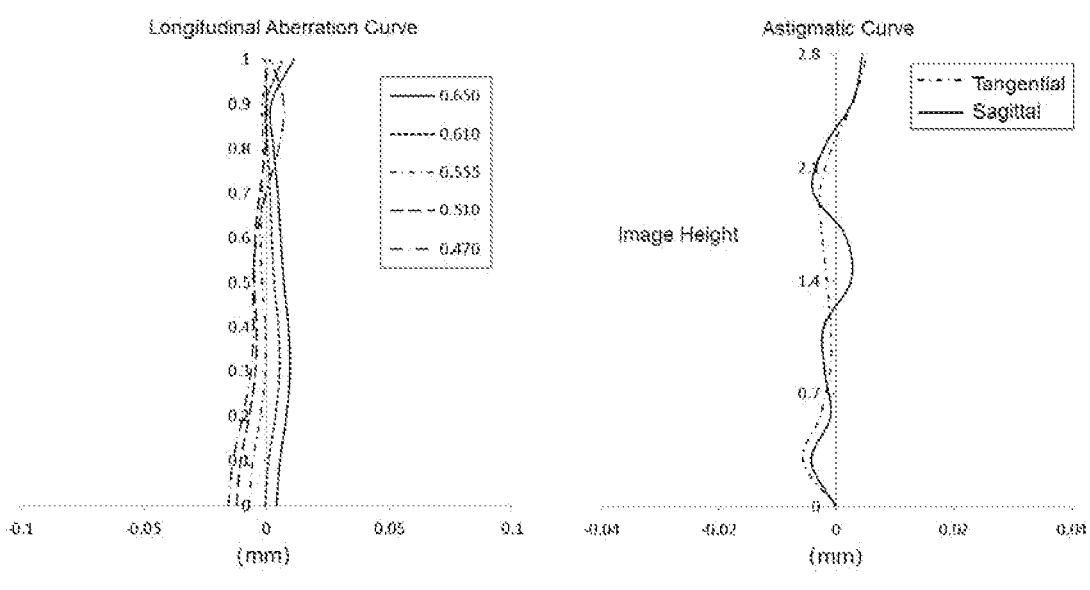
Fig. 10A
Fig. 10B
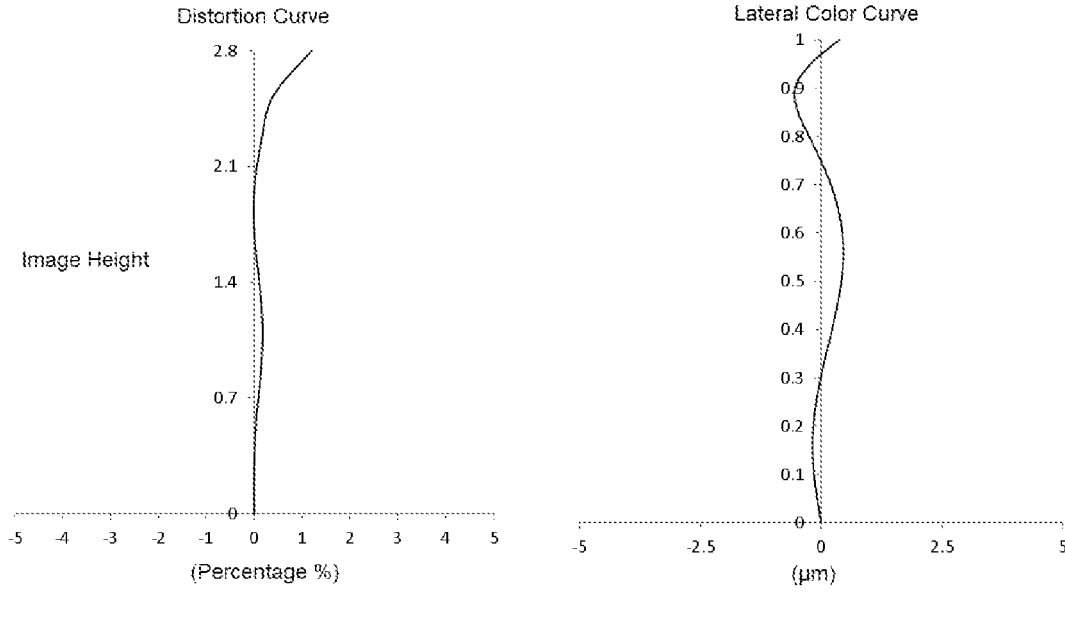
Fig. 10C
Fig. 10D

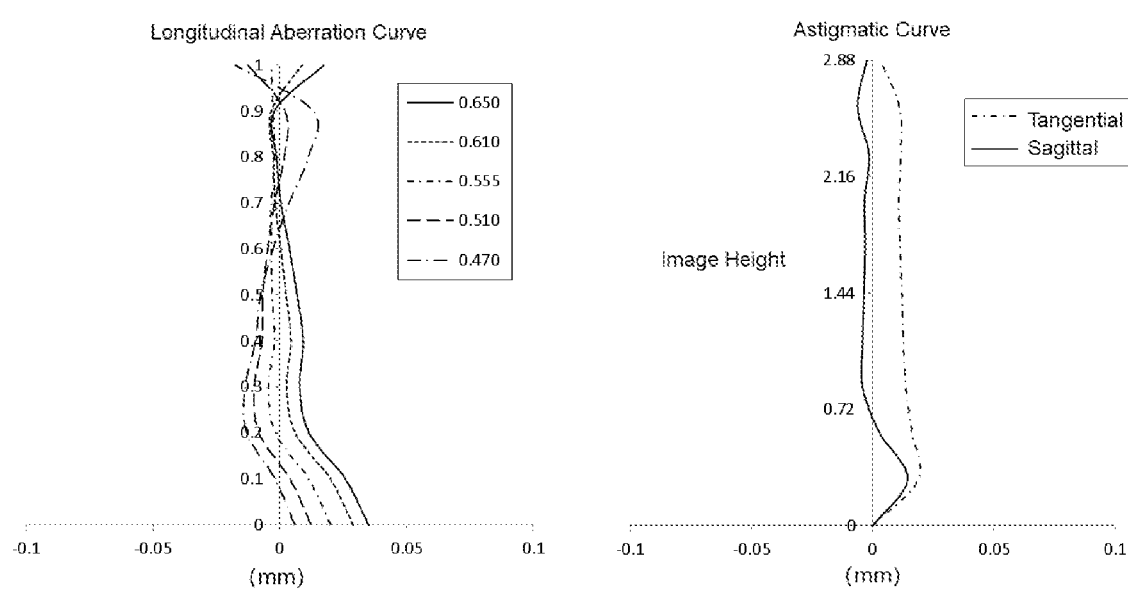
Fig. 12A
Fig. 12B
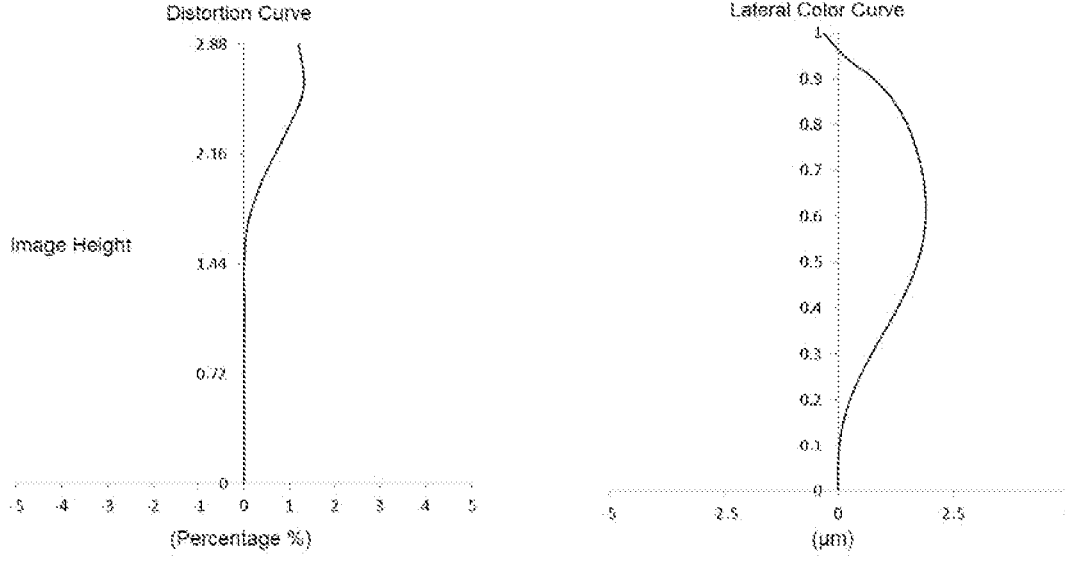
Fig. 12C
Fig. 12D

OPTICAL IMAGING LENS ASSEMBLY

CROSS-REFERENCE TO RELATED APPLICATIONS

This application claims benefit of priority to Chinese Patent Application No. 202110404494.X filed on Apr. 15, 2021 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

With the development of science and technology, people have higher and higher requirements for the photographing quality of mobile phones. At present, smartphones are generally equipped with a telephoto lens assembly to achieve zooming, such as dual camera: standard+telephoto lens assembly, or wide-angle+telephoto lens assembly, triple camera: wide-angle+telephoto+standard lens assembly. Among them, the telephoto lens assembly is mainly used to shoot distant objects, which can effectively blur the background and highlight the subject.

Due to the different shooting scenarios of mobile phones, different temperatures and humidity have a great impact on the photographing quality of mobile phones. In order to solve the effect of temperature on the telephoto lens assembly, a glass lens may be appropriately added to the optical system. The optical system may greatly improve the influence of temperature on the photographing quality, thereby improving the photographing quality of the camera lens assembly.

SUMMARY

An aspect of the present disclosure is to provide an optical imaging lens assembly which includes, sequentially along an optical axis from an object side to an image side: a stop, a first lens having positive refractive power; a second lens having positive refractive power or negative refractive power; a third lens having negative refractive power; a fourth lens having positive refractive power or negative refractive power; a fifth lens having negative refractive power; and a sixth lens having positive refractive power or negative refractive power, and an image-side surface of the sixth lens is convex. The first lens to the sixth lens may include two glass aspheric lenses. A distance TTL along the optical axis from an object-side surface of the first lens to an image plane of the optical imaging lens assembly and an effective focal length f of the optical imaging lens assembly may satisfy: $TTL/f<1.0$.

In one embodiment, a radius of curvature R2 of an image-side surface of the first lens and a radius of curvature R4 of an image-side surface of the second lens may satisfy: $-4.5<R2/R4<-1.5$.

In one embodiment, a radius of curvature R3 of an object-side surface of the second lens and an effective focal length f2 of the second lens may satisfy: $1.5<R3/f2<3.5$.

In one embodiment, the effective focal length f of the optical imaging lens assembly, a radius of curvature R1 of the object-side surface of the first lens and an effective focal length f1 of the first lens may satisfy: $5.5<f/R1+f/f1<6.5$.

In one embodiment, an effective focal length f3 of the third lens, a radius of curvature R5 of an object-side surface of the third lens and a radius of curvature R6 of an image-side surface of the third lens may satisfy: $-3.0<f3/(R5+R6)<-2.0$.

In one embodiment, an effective focal length f4 of the fourth lens, a radius of curvature R7 of an object-side surface of the fourth lens and a radius of curvature R8 of an image-side surface of the fourth lens may satisfy: $-2.0<f4/(R7+R8)<-1.0$.

In one embodiment, an effective focal length f5 of the fifth lens, a radius of curvature R9 of an object-side surface of the fifth lens and the effective focal length f of the optical imaging lens assembly may satisfy: $-2.0<(f5+R9)/f<-1.0$.

In one embodiment, a value f6 of an effective focal length of the sixth lens in mm, a value R12 of a radius of curvature of the image-side surface of the sixth lens in mm and a value R11 of a radius of curvature of an object-side surface of the sixth lens in mm may satisfy: $-2.0<f6/R12+R11<-1.5$.

In one embodiment, a spaced interval T23 between the second lens and the third lens along the optical axis and a spaced interval T45 between the fourth lens and the fifth lens along the optical axis may satisfy: $4.5<T23/T45<9.0$.

In one embodiment, a spaced interval T34 between the third lens and the fourth lens along the optical axis and a spaced interval T45 between the fourth lens and the fifth lens along the optical axis may satisfy: $4.5<T34/T45<8.5$.

In one embodiment, the distance TTL along the optical axis from the object-side surface of the first lens to the image plane of the optical imaging lens assembly and a spaced interval T56 between the fifth lens and the sixth lens along the optical axis may satisfy: $3.5\leq TTL/T56<4.5$.

In one embodiment, a center thickness CT6 of the sixth lens along the optical axis and a center thickness CT5 of the fifth lens along the optical axis may satisfy: $1.0<CT6/CT5\leq3.0$.

In one embodiment, a maximum effective radius DT11 of the object-side surface of the first lens and a maximum effective radius DT32 of an image-side surface of the third lens may satisfy: $1.0<DT11/DT32<1.5$.

In one embodiment, an F-number Fno of the optical imaging lens assembly and half of a maximum field-of-view HFOV of the optical imaging lens assembly may satisfy: $5.0<Fno/tan(HFOV)<6.0$.

In one embodiment, a radius of curvature R12 of the image-side surface of the sixth lens and a radius of curvature R11 of an object-side surface of the sixth lens may satisfy: $2.5<R12/R11<3.0$.

Another aspect of the present disclosure is to provide an optical imaging lens assembly which includes, sequentially along an optical axis from an object side to an image side, a stop, a first lens having positive refractive power; a second lens having positive refractive power or negative refractive power; a third lens having negative refractive power; a fourth lens having positive refractive power or negative refractive power; a fifth lens having negative refractive power; and a sixth lens having positive refractive power or negative refractive power, and an image-side surface of the sixth lens is convex. The first lens to the sixth lens may include two glass aspheric lenses. A radius of curvature R3 of an object-side surface of the second lens and an effective focal length f2 of the second lens may satisfy: $1.5<R3/f2<3.5$.

In one embodiment, a radius of curvature R2 of an image-side surface of the first lens and a radius of curvature R4 of an image-side surface of the second lens may satisfy: $-4.5 < R2/R4 < -1.5$.

In one embodiment, a distance TTL along the optical axis from an object-side surface of the first lens to an image plane of the optical imaging lens assembly and an effective focal length f of the optical imaging lens assembly may satisfy: $TTL/f < 1.0$.

In one embodiment, an effective focal length f of the optical imaging lens assembly, a radius of curvature R1 of an object-side surface of the first lens and an effective focal length f1 of the first lens may satisfy: $5.5 < f/R1 + f/f1 < 6.5$.

In one embodiment, an effective focal length f3 of the third lens, a radius of curvature R5 of an object-side surface of the third lens and a radius of curvature R6 of an image-side surface of the third lens may satisfy: $-3.0 < f3/(R5+R6) < -2.0$.

In one embodiment, an effective focal length f4 of the fourth lens, a radius of curvature R7 of an object-side surface of the fourth lens and a radius of curvature R8 of an image-side surface of the fourth lens may satisfy: $-2.0 < f4/(R7+R8) < -1.0$.

In one embodiment, an effective focal length f5 of the fifth lens, a radius of curvature R9 of an object-side surface of the fifth lens and an effective focal length f of the optical imaging lens assembly may satisfy: $-2.0 < (f5+R9)/f < -1.0$.

In one embodiment, a value f6 of an effective focal length of the sixth lens in mm, a value R12 of a radius of curvature of the image-side surface of the sixth lens in mm and a value R11 of a radius of curvature of an object-side surface of the sixth lens in mm may satisfy: $-2.0 < f6/R12 + R11 < -1.5$.

In one embodiment, a spaced interval T23 between the second lens and the third lens along the optical axis and a spaced interval T45 between the fourth lens and the fifth lens along the optical axis may satisfy: $4.5 < T23/T45 < 9.0$.

In one embodiment, a spaced interval T34 between the third lens and the fourth lens along the optical axis and a spaced interval T45 between the fourth lens and the fifth lens along the optical axis may satisfy: $4.5 < T34/T45 < 8.5$.

In one embodiment, a distance TTL along the optical axis from an object-side surface of the first lens to an image plane of the optical imaging lens assembly and a spaced interval T56 between the fifth lens and the sixth lens along the optical axis may satisfy: $3.5 \leq TTL/T56 < 4.5$.

In one embodiment, a center thickness CT6 of the sixth lens along the optical axis and a center thickness CT5 of the fifth lens along the optical axis may satisfy: $1.0 < CT6/CT5 \leq 3.0$.

In one embodiment, a maximum effective radius DT11 of an object-side surface of the first lens and a maximum effective radius DT32 of an image-side surface of the third lens may satisfy: $1.0 < DT11/DT32 < 1.5$.

In one embodiment, an F-number Fno of the optical imaging lens assembly and half of a maximum field-of-view HFOV of the optical imaging lens assembly may satisfy: $5.0 < Fno/tan(HFOV) < 6.0$.

In one embodiment, a radius of curvature R12 of the image-side surface of the sixth lens and a radius of curvature R11 of an object-side surface of the sixth lens may satisfy: $2.5 < R12/R11 < 3.0$.

The embodiments of the present disclosure employ a six-piece lens assembly structure. By properly adding glass lenses to the optical system, reasonably distributing the refractive power of each lens, and optimizing the surface type and thickness of each lens, the influence of temperature on the photographing quality of the optical lens assembly may be effectively improved, and the photographing quality of the optical lens assembly in different scenarios and different temperature conditions may be improved.

BRIEF DESCRIPTION OF THE DRAWINGS

Other features, objectives, and advantages of the present disclosure will become more apparent from the following detailed description of the non-limiting embodiments with reference to the accompanying drawings. In the drawings:

FIGS. 2A to 2D illustrate a longitudinal aberration curve, an astigmatic curve, a distortion curve, and a lateral color curve of the optical imaging lens assembly of the example 1, respectively;

FIGS. 4A to 4D illustrate a longitudinal aberration curve, an astigmatic curve, a distortion curve, and a lateral color curve of the optical imaging lens assembly of the example 2, respectively;

FIGS. 6A to 6D illustrate a longitudinal aberration curve, an astigmatic curve, a distortion curve, and a lateral color curve of the optical imaging lens assembly of the example 3, respectively;

FIGS. 10A to 10D illustrate a longitudinal aberration curve, an astigmatic curve, a distortion curve, and a lateral color curve of the optical imaging lens assembly of the example 5, respectively;

FIGS. 12A to 12D illustrate a longitudinal aberration curve, an astigmatic curve, a distortion curve, and a lateral color curve of the optical imaging lens assembly of the example 6, respectively.

DETAILED DESCRIPTION OF EMBODIMENTS

Figure 1:
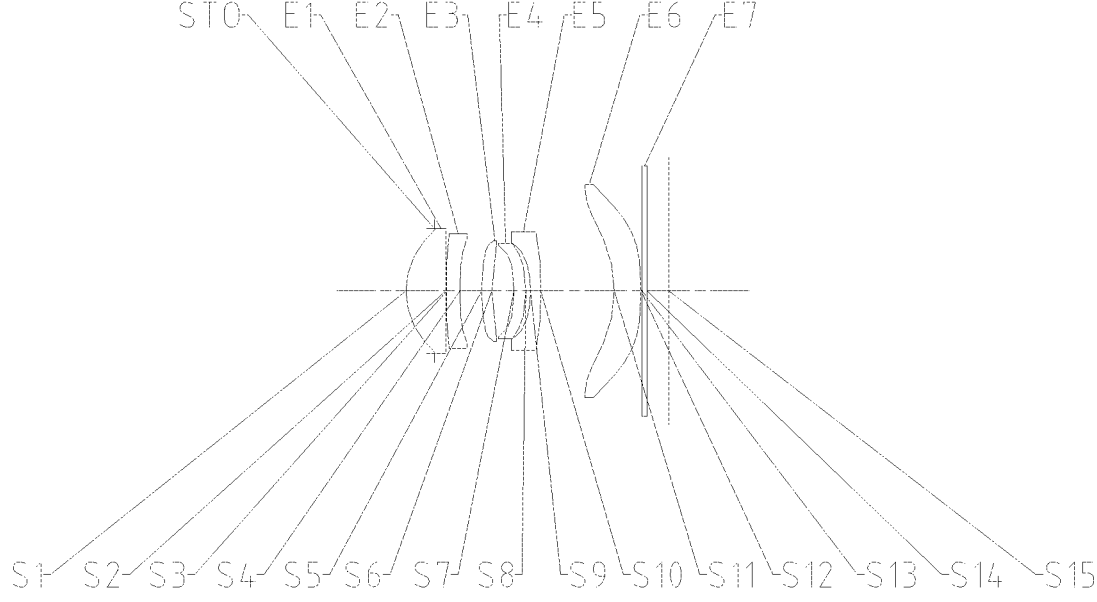
FIG. 1 illustrates a schematic structural diagram of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial area; and if a surface of a lens is concave and the position of the concave is not defined, it indicates that the surface of the lens is concave at least in the paraxial area. Herein, in each lens, the surface closest to the object is referred to as an object-side surface of the lens, and the surface closest to the image plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses having refractive power, ie, a first lens, a second lens, a third lens, a fourth lens, a fifth lens and a sixth lens. The six lenses are arranged sequentially from an object side to an image side along an optical axis.

In an exemplary embodiment, the first lens may have positive refractive power; the second lens may have positive or negative refractive power; the third lens may have negative refractive power; the fourth lens may have positive or negative refractive power; the fifth lens may have negative refractive power; and the sixth lens may have positive or negative refractive power.

In an exemplary embodiment, an image-side surface of the sixth lens may be convex.

In an exemplary embodiment, two or more pieces of glass aspheric lenses may be included in the first to sixth lenses.

By reasonably controlling the refractive power, surface type and material selection of each lens, the optical imaging lens assembly can be ensured to have high pixels and high resolution, as well as good temperature adaptability, so as to ensure that the lens assembly maintains good resolution in a wide temperature range.

In an exemplary embodiment, the optical imaging lens assembly according to the present disclosure may satisfy: $TTL/f < 1.0$, where TTL is a distance along the optical axis from an object-side surface of the first lens to an image plane of the optical imaging lens assembly, and f is an effective focal length of the optical imaging lens assembly. By controlling the ratio of the distance along the optical axis from the object-side surface of the first lens to the image plane of the optical imaging lens assembly to the effective focal length of the optical imaging lens assembly within this range, the telephoto characteristic of the optical system can be ensured, so that distant objects can be photographed clearly. More specifically, TTL and f may satisfy: $TTL/f < 0.95$.

In an exemplary embodiment, the optical imaging lens assembly according to the present disclosure may satisfy: $-4.5 < R2/R4 < -1.5$, where R2 is a radius of curvature of an image-side surface of the first lens, and R4 is a radius of curvature of an image-side surface of the second lens. By controlling the ratio of the radius of curvature of the image-side surface of the first lens to the radius of curvatures of the image-side surface of the second lens within this range, the shape of the second lens can be ensured to meet the processing and molding requirements. More specifically, R2 and R4 may satisfy: $-4.1 < R2/R4 < -1.8$.

In an exemplary embodiment, the optical imaging lens assembly according to the present disclosure may satisfy: $1.5 < R3/f2 < 3.5$, where R3 is a radius of curvature of an object-side surface of the second lens, and f2 is an effective focal length of the second lens. By controlling the ratio of the radius of curvature of the object-side surface of the second lens to the effective focal length of the second lens within this range, the distribution of the refractive power of the second lens can be ensured, the aberration of the optical system can be reduced, thereby improving the image quality of the optical system. More specifically, R3 and f2 may satisfy: $1.6 < R3/f2 < 3.2$.

In an exemplary embodiment, the optical imaging lens assembly according to the present disclosure may satisfy: $5.5 < f/R1 + f/f1 < 6.5$, where f is an effective focal length of the optical imaging lens assembly, R1 is a radius of curvature of an object-side surface of the first lens, and f1 is an effective focal length of the first lens. By controlling the effective focal length of the optical imaging lens assembly, the radius of curvature of the object-side surface of the first lens and the effective focal length of the first lens to satisfy $5.5 < f/R1 + f/f1 < 6.5$, the refractive power distribution of the first lens can be ensured, and the shape of the first lens can be ensured, thereby facilitating molding. In addition, the off-axis aberration can be corrected, thereby improving the image quality of the lens assembly. More specifically, f, R1 and f1 may satisfy: $5.9 < f/R1 + f/f1 < 6.3$.

In an exemplary embodiment, the optical imaging lens assembly according to the present disclosure may satisfy:

$-3.0 < f3/(R5+R6) < -2.0$, where f3 is an effective focal length of the third lens, R5 is a radius of curvature of an object-side surface of the third lens, and R6 is a radius of curvature of an image-side surface of the third lens. By controlling the ratio of the effective focal length of the third lens to the sum of the radius of curvature of the object-side surface of the third lens and the radius of curvature of the image-side surface of the third lens within this range, the refractive power distribution of the third lens can be ensured, and the shape of the third lens can be ensured, thereby facilitating molding. In addition, the off-axis aberration can be corrected, thereby improving the image quality of the lens assembly. More specifically, f3, R5 and R6 may satisfy: $-2.8 < f3/(R5+R6) < -2.1$.

In an exemplary embodiment, the optical imaging lens assembly according to the present disclosure may satisfy: $-2.0 < f4/(R7+R8) < -1.0$, where f4 is an effective focal length of the fourth lens, R7 is a radius of curvature of an object-side surface of the fourth lens, and R8 is a radius of curvature of an image-side surface of the fourth lens. By controlling the ratio of the effective focal length of the fourth lens to the sum of the radius of curvature of the object-side surface of the fourth lens and the radius of curvature of the image-side surface of the fourth lens within this range, the refractive power distribution of the fourth lens can be ensured, and the shape of the fourth lens can be ensured, thereby facilitating molding. In addition, the off-axis aberration can be corrected, thereby improving the image quality of the lens assembly. More specifically, f4, R7 and R8 may satisfy: $-1.4 < f4/(R7+R8) < -1.1$.

In an exemplary embodiment, the optical imaging lens assembly according to the present disclosure may satisfy: $-2.0 < (f5+R9)/f < -1.0$, where f5 is an effective focal length of the fifth lens, R9 is a radius of curvature of an object-side surface of the fifth lens, and f is an effective focal length of the optical imaging lens assembly. By controlling the ratio of the sum of the effective focal length of the fifth lens and the radius of curvature of the object-side surface of the fifth lens to the effective focal length of the optical imaging lens assembly within this range, the refractive power distribution of the fifth lens can be ensured, and the shape of the fifth lens can be ensured, thereby facilitating molding. In addition, the off-axis aberration can be corrected, thereby improving the image quality of the lens assembly. More specifically, f5, R9 and f may satisfy: $-1.8 < (f5+R9)/f < -1.2$.

In an exemplary embodiment, the optical imaging lens assembly according to the present disclosure may satisfy: $-2.0 < f6/R12+R11 < -1.5$, where f6 is a value of an effective focal length of the sixth lens in mm, R12 is a value of a radius of curvature of an image-side surface of the sixth lens in mm, and R11 is a value of a radius of curvature of an object-side surface of the sixth lens in mm. By controlling the sum of the ratio of the value of the effective focal length of the sixth lens in mm to the value of the radius of curvature of the image-side surface of the sixth lens in mm and the value of the radius of curvature of the object-side surface of the sixth lens in mm within this range, the refractive power distribution of the sixth lens can be ensured, and the shape of the sixth lens can be ensured, thereby facilitating molding. In addition, the off-axis aberration can be corrected, thereby improving the image quality of the lens assembly. More specifically, f6, R12 and R11 may satisfy: $-1.9 < f6/R12+R11 < -1.7$.

In an exemplary embodiment, the optical imaging lens assembly according to the present disclosure may satisfy: $4.5 < T23/T45 < 9.0$, where T23 is a spaced interval between the second lens and the third lens along the optical axis, and T45 is a spaced interval between the fourth lens and the fifth lens along the optical axis. By controlling the ratio of the spaced interval between the second lens and the third lens along the optical axis to the spaced interval between the fourth lens and the fifth lens along the optical axis within this range, it can be ensured that the total length of the optical system is not too large. More specifically, T23 and T45 may satisfy: $4.6 < T23/T45 < 8.9$.

In an exemplary embodiment, the optical imaging lens assembly according to the present disclosure may satisfy: $4.5 < T34/T45 < 8.5$, where T34 is a spaced interval between the third lens and the fourth lens along the optical axis, and T45 is a spaced interval between the fourth lens and the fifth lens along the optical axis. By controlling the ratio of the spaced interval between the third lens and the fourth lens along the optical axis to the spaced interval between the fourth lens and the fifth lens along the optical axis within this range, it can be ensured that the total length of the optical system is not too large. More specifically, T34 and T45 may satisfy: $4.7 < T34/T45 < 8.5$.

In an exemplary embodiment, the optical imaging lens assembly according to the present disclosure may satisfy: $3.5 < TTL/T56 < 4.5$, where TTL is a distance along the optical axis from an object-side surface of the first lens to an image plane of the optical imaging lens assembly, and T56 is a spaced interval between the fifth lens and the sixth lens along the optical axis. By controlling the ratio of the distance along the optical axis from an object-side surface of the first lens to an image plane of the optical imaging lens assembly to the spaced interval between the fifth lens and the sixth lens along the optical axis within this range, it can be ensured that the total length of the optical system is not too large. More specifically, TTL and T56 may satisfy: $3.5 \leq TTL/T56 < 4.3$.

In an exemplary embodiment, the optical imaging lens assembly according to the present disclosure may satisfy: $1.0 < CT6/CT5 \leq 3.0$, where CT6 is a center thickness of the sixth lens along the optical axis, and CT5 is a center thickness of the fifth lens along the optical axis. By controlling the ratio of the center thickness of the sixth lens along the optical axis to the center thickness of the fifth lens along the optical axis within this range, it can be ensured that the total length of the optical system is not too large. More specifically, CT6 and CT5 may satisfy: $1.4 < CT6/CT5 \leq 3.0$.

In an exemplary embodiment, the optical imaging lens assembly according to the present disclosure may satisfy: $1.0 < DT11/DT32 < 1.5$, where DT11 is a maximum effective radius of an object-side surface of the first lens, and DT32 is a maximum effective radius of an image-side surface of the third lens. By controlling the ratio of the maximum effective radius of the object-side surface of the first lens to the maximum effective radius of the image-side surface of the third lens within this range, the degree of lens curvature of the third lens may be controlled, so as to ensure the reasonable distribution of the refractive power of the third lens and reduce the system aberration, thereby improving the image quality of the system. More specifically, DT11 and DT32 may satisfy: $1.3 < DT11/DT32 < 1.5$.

In an exemplary embodiment, the optical imaging lens assembly according to the present disclosure may satisfy: $5.0 < Fno/tan(HFOV) < 6.0$, where Fno is an F-number of the optical imaging lens assembly, and HFOV is half of a maximum field-of-view of the optical imaging lens assembly. By controlling the ratio of the F-number of the optical imaging lens assembly to the tangent value of half of the maximum field-of-view of the optical imaging lens assembly within this range, the light throughput and imaging range of the optical system may be ensured. More specifically, Fno and HFOV may satisfy: 5.2<Fno/tan(HFOV)<5.7.

In an exemplary embodiment, the optical imaging lens assembly according to the present disclosure may satisfy: 2.5<R12/R11<3.0, where R12 is a radius of curvature of an image-side surface of the sixth lens, and R11 is a radius of curvature of an object-side surface of the sixth lens. By controlling the ratio of the radius of curvature of the image-side surface of the sixth lens to the radius of curvature of the object-side surface of the sixth lens within this range, it may be ensured that the shape of the sixth lens meets the processing and molding requirements. More specifically, R12 and R11 may satisfy: 2.7<R12/R11<2.8.

In an exemplary embodiment, the above optical imaging lens assembly may further include at least one stop. The stop may be disposed at an appropriate position as required, for example, between the object side and the first lens. Optionally, the above optical imaging lens assembly may further include an optical filter for correcting the color deviation and/or a protective glass for protecting the photosensitive element located on an image plane.

The optical imaging lens assembly according to the above embodiments of the present disclosure may employ a plurality of lenses, such as six lenses as described above. By reasonably selecting the material of the lens, and reasonably distributing the refractive power of each lens, the surface type, the center thickness of each lens, and spaced intervals along the optical axis between the lenses, the optical imaging lens assembly may be ensured to have high pixels and high resolution, as well as good temperature adaptability, so as to ensure that the lens assembly maintains good resolution in a wide temperature range.

In the embodiments of the present disclosure, two or more lenses among the first lens, the second lens, the third lens, the fourth lens, the fifth lens and the sixth lens may be made of glass material.

In the embodiments of the present disclosure, the first to sixth lenses may include two or more aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens and the sixth lens are aspheric.

However, it should be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to having the six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 illustrates a schematic structural diagram of the optical imaging lens assembly according to example 1 of the present disclosure.

As shown in FIG. 1, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is convex. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 1 shows the basic parameters of the optical imaging lens assembly of example 1, wherein the units for the radius of curvature and the thickness/distance are millimeter (mm).

TABLE 1

| Surface number | Surface type | Radius of curvature | Thickness/ Distance | Material | | Conic coefficient |
| | | | | Refractive index | Abbe number | |
| --- | --- | --- | --- | --- | --- | --- |
| OBJ | Spherical | Infinite | Infinite | | | |
| STO | Spherical | Infinite | −0.6075 | | | |
| S1 | Aspheric | 1.6435 | 0.8529 | 1.55 | 71.7 | −0.0546 |
| S2 | Aspheric | −26.7720 | 0.0250 | | | −0.0667 |
| S3 | Aspheric | −21.9648 | 0.2800 | 1.83 | 24.1 | −99.0000 |
| S4 | Aspheric | 8.0059 | 0.4664 | | | 20.7096 |
| S5 | Aspheric | 3.4084 | 0.2200 | 1.55 | 56.1 | 8.7218 |
| S6 | Aspheric | 2.3885 | 0.4747 | | | 1.9837 |
| S7 | Aspheric | −4.5149 | 0.2561 | 1.67 | 20.4 | 17.4642 |
| S8 | Aspheric | −2.6852 | 0.1000 | | | 4.0560 |
| S9 | Aspheric | −2.8115 | 0.2200 | 1.55 | 56.1 | 5.0358 |
| S10 | Aspheric | −68.5200 | 1.5799 | | | 99.0000 |

TABLE 1-continued

| Surface number | Surface type | Radius of curvature | Thickness/ Distance | Material Refractive index | Abbe number | Conic coefficient |
|---|---|---|---|---|---|---|
| S11 | Aspheric | −2.9329 | 0.5750 | 1.54 | 55.8 | −0.1920 |
| S12 | Aspheric | −7.9654 | 0.0235 | | | 10.5205 |
| S13 | Spherical | Infinite | 0.1100 | 1.52 | 64.2 | |
| S14 | Spherical | Infinite | 0.4665 | | | |
| S15 | Spherical | Infinite | | | | |

In example 1, the object-side surface and the image-side surface of any one of the first lens E1 to the sixth lens E6 are aspheric. The surface type x of each aspheric lens may be defined by using, but not limited to, the following aspheric formula:

$$x = \frac{ch^2}{1 + \sqrt{1 - (k+1)c^2h^2}} + \sum Aih^i \qquad (1)$$

Here, x is the sag—the axis-component of the displacement of the surface from the aspheric vertex, when the surface is at height h from the optical axis; c is a paraxial curvature of the aspheric surface, and c=1/R (i.e., the paraxial curvature c is reciprocal of the radius of curvature R in Table 1 above); k is a conic coefficient; and Ai is a correction coefficient for the i-th order of the aspheric surface. Table 2-1 and Table 2-2 below show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 1.

TABLE 2-1

| Surface number | $A_4$ | $A_6$ | $A_8$ | $A_{10}$ | $A_{12}$ |
|---|---|---|---|---|---|
| S1 | −3.3998E−02 | −8.0747E−03 | −8.9525E−04 | 3.6978E−04 | 2.6358E−04 |
| S2 | 2.7819E−02 | 4.3046E−04 | 5.2846E−04 | 2.8763E−04 | −3.9943E−04 |
| S3 | 7.4909E−02 | 2.0739E−03 | −1.6944E−03 | −1.1481E−04 | −4.4224E−04 |
| S4 | 5.6924E−02 | 4.9731E−03 | −2.4490E−03 | −3.6044E−04 | −1.8584E−04 |
| S5 | −8.4281E−02 | 2.5093E−02 | −1.6783E−03 | 7.4993E−04 | 3.7895E−05 |
| S6 | −1.5715E−01 | 1.2451E−02 | −2.0247E−03 | 6.6889E−04 | −2.5950E−05 |
| S7 | −1.3647E−01 | −1.7703E−02 | 3.3709E−03 | 2.6812E−03 | 8.2021E−04 |
| S8 | −3.7746E−02 | −1.0706E−02 | 7.0188E−03 | 1.8721E−03 | 6.4701E−04 |
| S9 | −9.9587E−02 | −8.7911E−03 | −2.2421E−03 | −2.7144E−03 | −5.0260E−04 |
| S10 | −9.7777E−02 | 1.9416E−02 | −3.4702E−03 | −7.3440E−04 | 4.1893E−04 |
| S11 | 2.0437E−01 | 1.0495E−01 | −9.9930E−03 | −4.2092E−03 | 3.0034E−03 |
| S12 | −6.3996E−01 | 1.2592E−01 | 1.6624E−02 | 4.8710E−03 | 2.7097E−03 |

TABLE 2-2

| Surface number | $A_{14}$ | $A_{16}$ | $A_{18}$ | $A_{20}$ |
|---|---|---|---|---|
| S1 | 1.0109E−04 | 1.6464E−05 | −6.7416E−06 | −5.4929E−06 |
| S2 | 1.0943E−04 | −1.4193E−04 | 1.7687E−06 | 9.2007E−06 |
| S3 | 5.2222E−05 | −8.9310E−05 | −5.1150E−06 | 1.0817E−05 |
| S4 | 9.9593E−06 | 4.4819E−06 | 1.2583E−05 | 6.9291E−06 |
| S5 | 1.9304E−05 | 1.3465E−06 | −1.0874E−05 | −1.4667E−05 |
| S6 | −5.9554E−05 | −5.9059E−05 | −3.4005E−05 | −2.3424E−05 |
| S7 | 1.3038E−05 | −5.8018E−05 | −2.4284E−05 | −1.8807E−06 |
| S8 | 1.1813E−04 | 2.0219E−04 | 8.8456E−05 | 2.8402E−05 |
| S9 | −1.8156E−04 | 1.9630E−04 | 9.4344E−05 | 3.7089E−05 |
| S10 | 3.8609E−06 | 3.8072E−05 | −3.0430E−05 | 1.9294E−06 |
| S11 | 1.0234E−03 | −2.3954E−04 | −1.2612E−04 | −1.2852E−05 |
| S12 | 2.4511E−03 | 1.5394E−03 | 8.0789E−04 | 2.6491E−04 |

FIG. 2A illustrates a longitudinal aberration curve of the optical imaging lens assembly according to example 1, representing deviations of focal points of light of different wavelengths converged after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing the amounts of distortion corresponding to different image heights. FIG. 2D illustrates a lateral color curve of the optical imaging lens assembly according to example 1, representing the deviations of different image heights on an image plane after light passes through the lens assembly. It can be seen from FIG. 2A to FIG. 2D that the optical imaging lens assembly provided in example 1 can achieve good image quality.

Example 2

Figure 3:
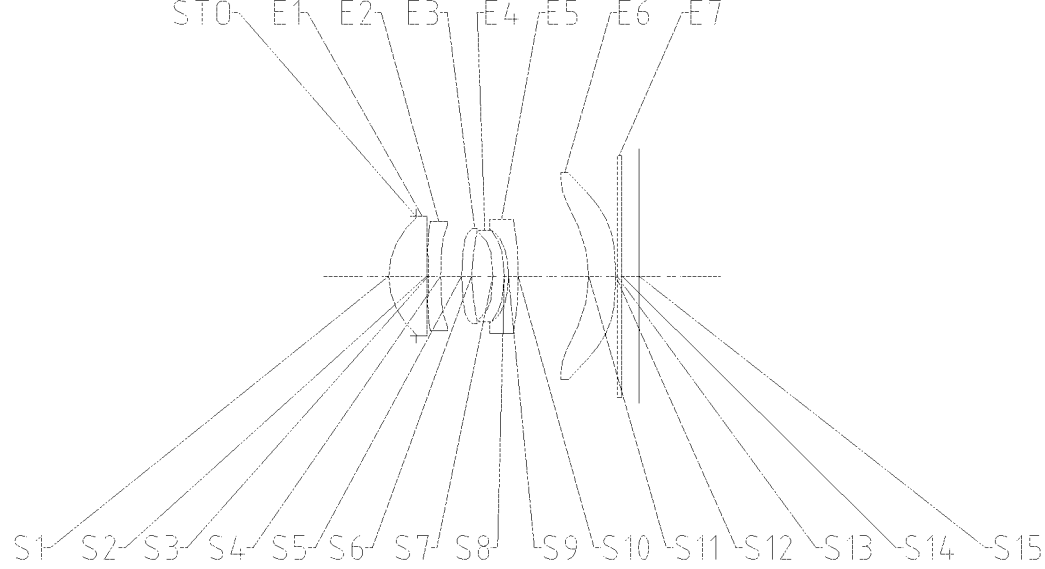
FIG. 3 illustrates a schematic structural diagram of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 illustrates a schematic structural diagram of the optical imaging lens assembly according to example 2 of the present disclosure.

As shown in FIG. 3, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is concave. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 3 shows the basic parameters of the optical imaging lens assembly of example 2, wherein the units for the radius of curvature and the thickness/distance are millimeter (mm). Table 4-1 and Table 4-2 show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 2, wherein the surface type of each aspheric surface may be defined by the formula (1) given in the above example 1.

TABLE 3

| Surface number | Surface type | Radius of curvature | Thickness/ Distance | Material Refractive index | Material Abbe number | Conic coefficient |
|---|---|---|---|---|---|---|
| OBJ | Spherical | Infinite | Infinite | | | |
| STO | Spherical | Infinite | −0.6135 | | | |
| S1 | Aspheric | 1.6501 | 0.8592 | 1.55 | 71.7 | −0.0500 |
| S2 | Aspheric | −26.9562 | 0.0347 | | | 48.0567 |
| S3 | Aspheric | −17.1325 | 0.2800 | 1.83 | 24.1 | −90.0000 |
| S4 | Aspheric | 9.0912 | 0.4743 | | | 25.1694 |
| S5 | Aspheric | 3.3938 | 0.2267 | 1.55 | 56.1 | 8.7165 |
| S6 | Aspheric | 2.3405 | 0.4784 | | | 2.1792 |
| S7 | Aspheric | −4.6604 | 0.2631 | 1.67 | 20.4 | 17.8190 |
| S8 | Aspheric | −1.9484 | 0.0918 | | | 0.0000 |
| S9 | Aspheric | −2.9138 | 0.2200 | 1.55 | 56.1 | 4.9944 |
| S10 | Aspheric | 209.9973 | 1.5996 | | | −90.0000 |
| S11 | Aspheric | −2.9366 | 0.6110 | 1.54 | 55.8 | −0.1846 |
| S12 | Aspheric | −7.9888 | 0.0300 | | | 10.4444 |
| S13 | Spherical | Infinite | 0.1100 | 1.52 | 64.2 | |
| S14 | Spherical | Infinite | 0.3849 | | | |
| S15 | Spherical | Infinite | | | | |

TABLE 4-1

| Surface number | $A_4$ | $A_6$ | $A_8$ | $A_{10}$ | $A_{12}$ |
|---|---|---|---|---|---|
| S1 | 3.2670E−02 | −8.7361E−03 | −1.3022E−03 | 1.7107E−04 | 2.9012E−04 |
| S2 | 2.7457E−02 | −5.1454E−04 | 4.2335E−04 | 7.8752E−04 | 4.8006E−05 |
| S3 | 7.5913E−02 | 2.4039E−03 | −1.5223E−03 | 3.3105E−04 | −1.2033E−04 |
| S4 | 6.0365E−02 | 5.7938E−03 | −2.3339E−03 | −2.5372E−04 | −1.3159E−04 |
| S5 | −8.4600E−02 | 2.6565E−02 | −2.7069E−03 | 2.4106E−04 | −2.0088E−04 |
| S6 | −1.5708E−01 | 1.4753E−02 | −2.2099E−03 | 1.9480E−04 | −2.5545E−04 |
| S7 | −1.4034E−01 | −1.8709E−02 | 3.5519E−03 | 2.0421E−03 | 7.0728E−04 |
| S8 | 5.6391E−02 | 4.4318E−02 | −3.8950E−02 | 1.6871E−02 | −1.0651E−02 |
| S9 | −9.9077E−02 | −8.5171E−03 | −3.0451E−03 | −3.9062E−03 | −3.4615E−04 |
| S10 | −1.1029E−01 | 2.2006E−02 | −4.9531E−03 | −5.7282E−04 | 5.8101E−04 |
| S11 | 2.0091E−01 | 1.0793E−01 | −1.2744E−02 | −4.9826E−03 | 3.0786E−03 |
| S12 | −6.5742E−01 | 1.2924E−01 | 1.2173E−02 | 1.9835E−03 | 1.2906E−03 |

TABLE 4-2

| Surface number | $A_{14}$ | $A_{16}$ | $A_{18}$ | $A_{20}$ |
|---|---|---|---|---|
| S1 | 1.5609E−04 | 7.1608E−05 | 1.7132E−05 | 1.0037E−05 |
| S2 | 1.3112E−04 | −9.9416E−05 | 5.7730E−05 | −2.1865E−06 |

TABLE 4-2-continued

| Surface number | $A_{14}$ | $A_{16}$ | $A_{18}$ | $A_{20}$ |
|---|---|---|---|---|
| S3 | 5.7573E−05 | −9.1488E−05 | 3.5845E−05 | −3.4727E−07 |
| S4 | 9.1817E−06 | −1.0475E−05 | 1.4068E−05 | 2.2930E−06 |
| S5 | −1.2688E−04 | −5.9977E−05 | −2.8883E−05 | −9.6334E−06 |
| S6 | −1.7926E−04 | −9.6108E−05 | −3.2146E−05 | −1.2493E−05 |
| S7 | 7.6273E−05 | −3.7450E−05 | −4.2690E−05 | −1.4389E−05 |
| S8 | 4.8196E−03 | −1.5920E−03 | 1.8762E−04 | −1.5854E−05 |
| S9 | 3.4031E−05 | 1.7276E−04 | 1.4192E−05 | 1.1188E−05 |
| S10 | −2.4426E−05 | 1.6554E−06 | −2.6074E−05 | 9.8567E−06 |
| S11 | 9.7999E−04 | −3.6793E−04 | −1.5727E−05 | −4.7039E−05 |
| S12 | 1.6536E−03 | 8.6732E−04 | 6.6924E−04 | 2.2974E−04 |

FIG. 4A illustrates a longitudinal aberration curve of the optical imaging lens assembly according to example 2, representing deviations of focal points of light of different wavelengths converged after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing the amounts of distortion corresponding to different image heights. FIG. 4D illustrates a lateral color curve of the optical imaging lens assembly according to example 2, representing the deviations of different image heights on an image plane after light passes through the lens assembly. It can be seen from FIG. 4A to FIG. 4D that the optical imaging lens assembly provided in example 2 can achieve good image quality.

Example 3

Figure 5:
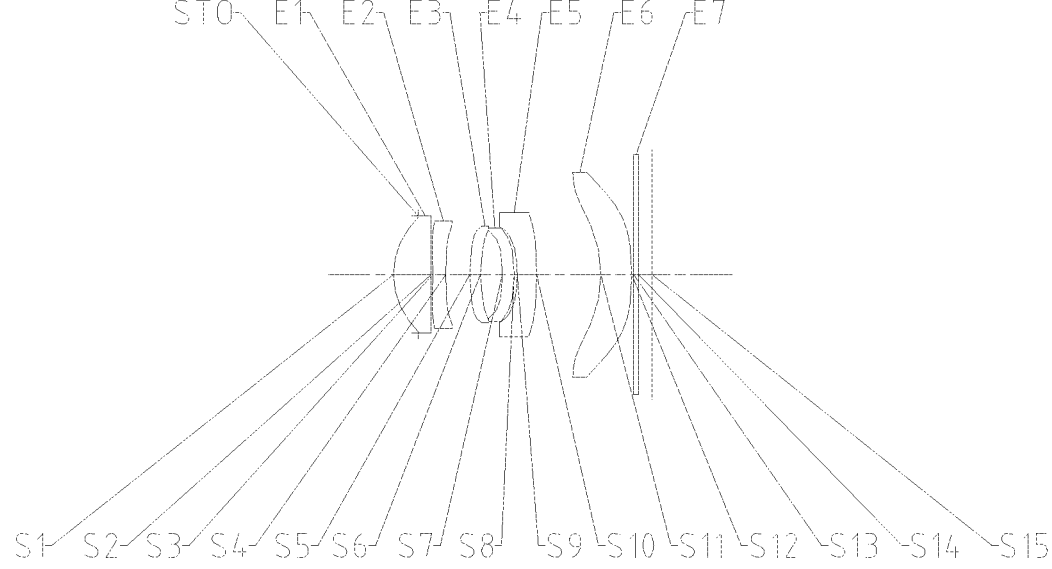
FIG. 5 illustrates a schematic structural diagram of an optical imaging lens assembly according to example 3 of the present disclosure.

An optical imaging lens assembly according to example 3 of the present disclosure is described below with reference to FIG. 5 to FIG. 6D. FIG. 5 illustrates a schematic structural diagram of the optical imaging lens assembly according to example 3 of the present disclosure.

As shown in FIG. 5, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

convex. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 5 shows the basic parameters of the optical imaging lens assembly of example 3, wherein the units for the radius of curvature and the thickness/distance are millimeter (mm). Table 6-1 and Table 6-2 show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 3, wherein the surface type of each aspheric surface may be defined by the formula (1) given in the above example 1.

TABLE 5

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| STO | Spherical | Infinite | −0.5525 | | | |
| S1 | Aspheric | 1.7103 | 0.8520 | 1.55 | 71.7 | −0.0465 |
| S2 | Aspheric | −20.0363 | 0.0339 | | | −90.0000 |
| S3 | Aspheric | −14.4932 | 0.2938 | 1.83 | 24.1 | −86.1588 |
| S4 | Aspheric | 11.0434 | 0.5416 | | | 31.4369 |
| S5 | Aspheric | 3.4081 | 0.2362 | 1.55 | 56.1 | 8.5861 |
| S6 | Aspheric | 2.2006 | 0.4970 | | | 2.5235 |
| S7 | Aspheric | −5.2334 | 0.2678 | 1.67 | 20.4 | 18.4687 |
| S8 | Aspheric | −3.1283 | 0.0674 | | | 0.6900 |
| S9 | Aspheric | −3.7593 | 0.4378 | 1.55 | 56.1 | 5.9148 |
| S10 | Aspheric | −69.0545 | 1.4470 | | | −90.0000 |
| S11 | Aspheric | −2.9503 | 0.6927 | 1.54 | 55.8 | −0.1755 |
| S12 | Aspheric | −8.0279 | 0.0452 | | | 9.9727 |
| S13 | Spherical | Infinite | 0.1100 | 1.52 | 64.2 | |
| S14 | Spherical | Infinite | 0.2982 | | | |
| S15 | Spherical | Infinite | | | | |

TABLE 6-1

| Surface number | $A_4$ | $A_6$ | $A_8$ | $A_{10}$ | $A_{12}$ |
|---|---|---|---|---|---|
| S1 | −3.1328E−02 | −8.7683E−03 | −1.3110E−03 | 1.7967E−04 | 2.3290E−04 |
| S2 | 2.9997E−02 | −2.2299E−03 | −1.6582E−04 | 8.9476E−04 | −1.3544E−04 |
| S3 | 7.7890E−02 | 3.9282E−03 | −2.0913E−03 | 4.7540E−04 | −2.0863E−04 |
| S4 | 6.2629E−02 | 8.0139E−03 | −2.4240E−03 | −2.8561E−04 | −1.5386E−04 |
| S5 | −7.3018E−02 | 2.9891E−02 | −2.8769E−03 | 4.4472E−04 | −4.3490E−05 |
| S6 | −1.5383E−01 | 2.1876E−02 | −7.9616E−04 | 1.1293E−03 | 2.7241E−04 |
| S7 | −1.3950E−01 | −2.1670E−02 | 2.6322E−03 | 1.5416E−03 | 6.1539E−04 |
| S8 | −8.5403E−02 | −2.0420E−02 | 6.8283E−03 | 3.4477E−04 | 7.7447E−04 |
| S9 | −1.1344E−01 | −8.0547E−03 | −9.2124E−04 | −2.5777E−03 | −1.1999E−04 |
| S10 | −1.2687E−01 | 1.9555E−02 | −4.3045E−03 | −5.2695E−04 | 2.1597E−04 |
| S11 | 2.0465E−01 | 1.0393E−01 | −1.1888E−02 | 7.6670E−04 | 3.4887E−03 |
| S12 | −6.3810E−01 | 1.1439E−01 | 1.0422E−02 | 5.4989E−03 | 3.5161E−03 |

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is

TABLE 6-2

| Surface number | $A_{14}$ | $A_{16}$ | $A_{18}$ | $A_{20}$ |
|---|---|---|---|---|
| S1 | 1.0434E−04 | 3.1218E−05 | 6.6357E−06 | 5.9586E−07 |
| S2 | 5.1237E−05 | −1.1424E−05 | 4.7955E−06 | 4.0084E−06 |
| S3 | 2.3600E−05 | −1.6898E−05 | 2.5221E−06 | 3.3091E−06 |
| S4 | 5.0653E−06 | 2.6642E−06 | 3.6584E−06 | 1.0560E−06 |
| S5 | −1.9188E−05 | −7.6566E−05 | −2.6235E−06 | −1.8406E−06 |
| S6 | 9.5965E−05 | 2.9728E−05 | 9.0939E−06 | 1.0524E−06 |
| S7 | 4.7120E−05 | −5.5237E−05 | −4.1900E−05 | −1.4945E−05 |
| S8 | 1.2085E−04 | 7.7521E−05 | −1.8349E−05 | 8.6197E−06 |

TABLE 6-2-continued

| Surface number | $A_{14}$ | $A_{16}$ | $A_{18}$ | $A_{20}$ |
|---|---|---|---|---|
| S9 | −1.0698E−04 | 2.2802E−05 | −3.6551E−05 | 2.1665E−06 |
| S10 | 2.8808E−05 | −7.5369E−06 | −5.8478E−06 | 1.5452E−06 |
| S11 | −4.5777E−04 | −7.7850E−04 | 1.7461E−04 | 8.7989E−05 |
| S12 | 2.7134E−03 | 9.0450E−05 | 8.6321E−06 | −2.1157E−04 |

FIG. 6A illustrates a longitudinal aberration curve of the optical imaging lens assembly according to example 3, representing deviations of focal points of light of different wavelengths converged after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing the amounts of distortion corresponding to different image heights. FIG. 6D illustrates a lateral color curve of the optical imaging lens assembly according to example 3, representing the deviations of different image heights on an image plane after light passes through the lens assembly. It can be seen from FIG. 6A to FIG. 6D that the optical imaging lens assembly provided in example 3 can achieve good image quality.

Example 4

Figure 7:
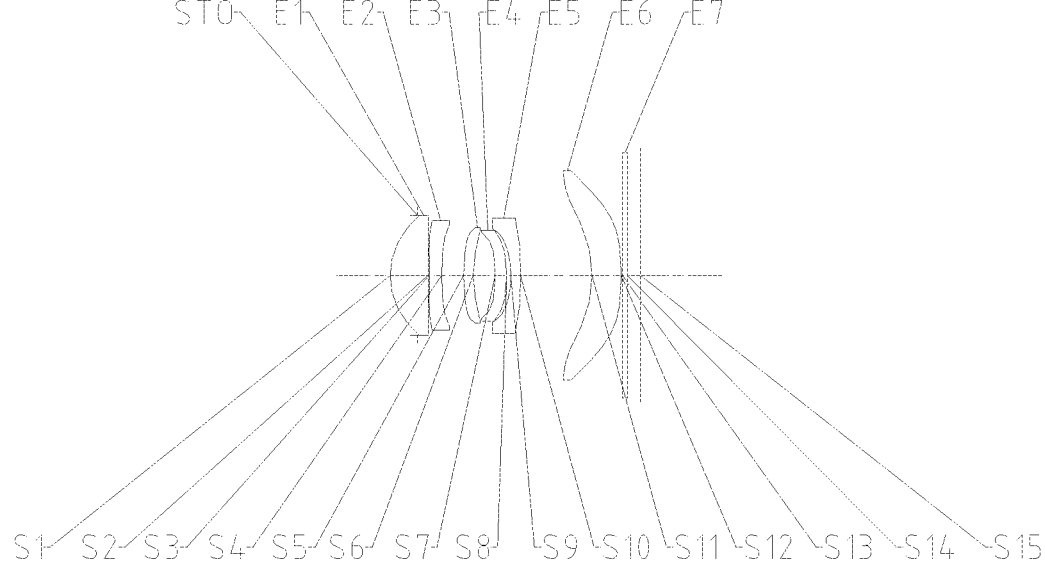
FIG. 7 illustrates a schematic structural diagram of an optical imaging lens assembly according to example 4 of the present disclosure.

An optical imaging lens assembly according to example 4 of the present disclosure is described below with reference to FIG. 7 to FIG. 8D. FIG. 7 illustrates a schematic structural diagram of the optical imaging lens assembly according to example 4 of the present disclosure.

As shown in FIG. 7, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is concave. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 7 shows the basic parameters of the optical imaging lens assembly of example 4, wherein the units for the radius of curvature and the thickness/distance are millimeter (mm). Table 8-1 and Table 8-2 show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 4, wherein the surface type of each aspheric surface may be defined by the formula (1) given in the above example 1.

TABLE 7

| Surface number | Surface type | Radius of curvature | Thickness/ Distance | Material Refractive index | Material Abbe number | Conic coefficient |
|---|---|---|---|---|---|---|
| OBJ | Spherical | Infinite | Infinite | | | |
| STO | Spherical | Infinite | −0.6192 | | | |
| S1 | Aspheric | 1.6486 | 0.8580 | 1.55 | 71.7 | −0.0455 |
| S2 | Aspheric | −34.3100 | 0.0311 | | | −74.5099 |
| S3 | Aspheric | −22.9475 | 0.2800 | 1.83 | 24.1 | −90.0000 |
| S4 | Aspheric | 8.4671 | 0.4928 | | | 29.6443 |
| S5 | Aspheric | 3.3811 | 0.2206 | 1.55 | 56.1 | 8.6681 |
| S6 | Aspheric | 2.2609 | 0.4959 | | | 2.3312 |
| S7 | Aspheric | −4.9804 | 0.2637 | 1.67 | 20.4 | 19.2139 |
| S8 | Aspheric | −2.7219 | 0.0893 | | | −0.1866 |
| S9 | Aspheric | −3.0812 | 0.2200 | 1.55 | 56.1 | 5.2810 |
| S10 | Aspheric | 33.7348 | 1.6204 | | | −90.0000 |
| S11 | Aspheric | −2.9428 | 0.6607 | 1.54 | 55.8 | −0.1790 |
| S12 | Aspheric | −8.0751 | 0.0300 | | | 10.1039 |
| S13 | Spherical | Infinite | 0.1100 | 1.52 | 64.2 | |
| S14 | Spherical | Infinite | 0.2969 | | | |
| S15 | Spherical | Infinite | | | | |

TABLE 8-1

| Surface number | $A_4$ | $A_6$ | $A_8$ | $A_{10}$ | $A_{12}$ |
|---|---|---|---|---|---|
| S1 | −3.0502E−02 | −9.1153E−03 | −1.6441E−03 | 4.8260E−05 | 2.7204E−04 |
| S2 | 2.8449E−02 | −1.8539E−03 | 9.6287E−05 | 9.2657E−04 | 5.1862E−05 |
| S3 | 7.7870E−02 | 3.6331E−03 | −1.7930E−03 | 4.4072E−04 | −8.0144E−05 |

TABLE 8-1-continued

| Surface number | $A_4$ | $A_6$ | $A_8$ | $A_{10}$ | $A_{12}$ |
|---|---|---|---|---|---|
| S4 | 6.1889E−02 | 8.1307E−03 | −2.4220E−03 | −3.6313E−04 | −1.6139E−04 |
| S5 | −7.2920E−02 | 2.8943E−02 | −2.7715E−03 | 3.3387E−04 | −9.5363E−05 |
| S6 | −1.5490E−01 | 1.7672E−02 | −2.5209E−03 | 1.4533E−04 | −2.8303E−04 |
| S7 | −1.4408E−01 | −2.0985E−02 | 3.2340E−03 | 1.9907E−03 | 7.7144E−04 |
| S8 | −7.9584E−02 | −1.8817E−02 | 8.3689E−03 | 1.2146E−03 | 1.1164E−03 |
| S9 | −1.0892E−01 | −6.5050E−03 | −2.4924E−03 | −3.3800E−03 | −1.7535E−04 |
| S10 | −1.2418E−01 | 2.2731E−02 | −4.7709E−03 | −4.9149E−04 | 3.4015E−04 |
| S11 | 2.0720E−01 | 1.0608E−01 | −1.3901E−02 | −6.1765E−03 | 2.5125E−03 |
| S12 | −7.0519E−01 | 1.3318E−01 | 8.1217E−03 | −5.2402E−04 | −3.6627E−04 |

TABLE 8-2

| Surface number | $A_{14}$ | $A_{16}$ | $A_{18}$ | $A_{20}$ |
|---|---|---|---|---|
| S1 | 1.5537E−04 | 7.3471E−05 | 2.0086E−05 | 1.0793E−05 |
| S2 | 6.2725E−05 | −4.4891E−05 | 3.8525E−05 | −3.0709E−06 |
| S3 | 1.9508E−05 | −5.0014E−05 | 1.9671E−05 | −6.5386E−07 |
| S4 | −3.3021E−06 | −3.3672E−06 | 9.5173E−06 | 1.0296E−06 |
| S5 | −6.9394E−05 | −2.1771E−05 | −1.3817E−05 | −2.0247E−06 |
| S6 | −1.9281E−04 | −9.7799E−05 | −3.6129E−05 | −1.3813E−05 |
| S7 | 2.7518E−04 | −6.4869E−05 | −5.0117E−05 | −7.4372E−06 |
| S8 | 2.3081E−04 | 1.6791E−04 | 3.3613E−05 | 2.8238E−05 |
| S9 | −2.2088E−04 | 4.2822E−05 | −1.5483E−05 | 1.9863E−05 |
| S10 | −4.2407E−05 | 1.5323E−05 | −1.0263E−05 | 2.0792E−06 |
| S11 | 7.5593E−04 | −5.1045E−04 | 1.2466E−04 | −2.2807E−05 |
| S12 | 7.9513E−04 | 1.9181E−05 | 2.2531E−04 | 1.0447E−04 |

Figure 8A:
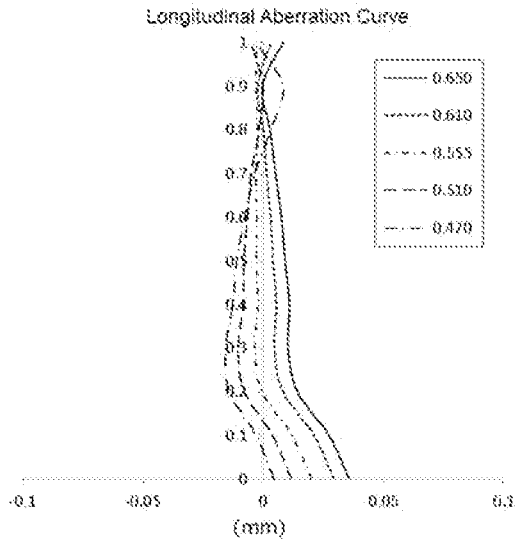
FIGS. 8A to 8D illustrate a longitudinal aberration curve, an astigmatic curve, a distortion curve, and a lateral color curve of the optical imaging lens assembly of the example 4, respectively.
Figure 8B:
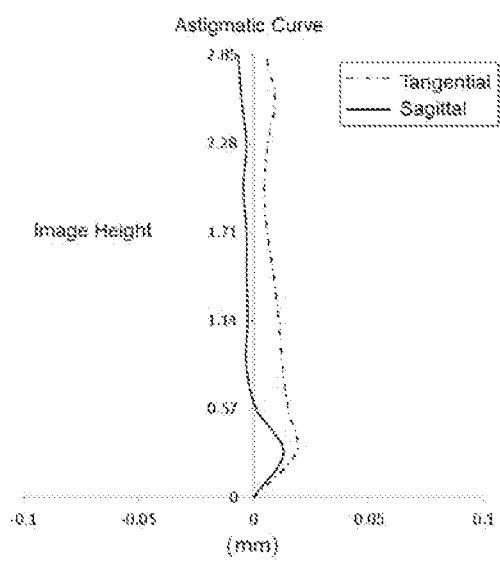
Figure 8C:
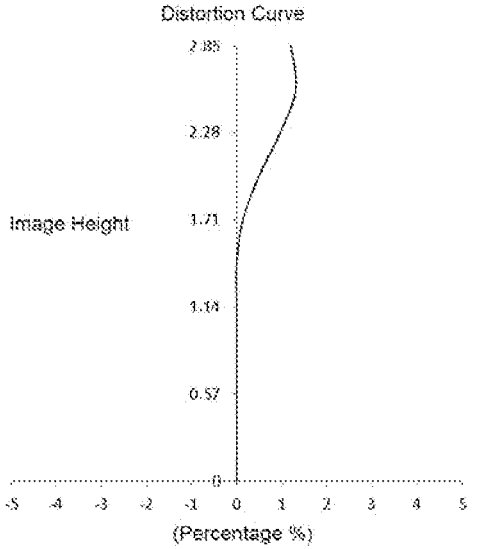
Figure 8D:
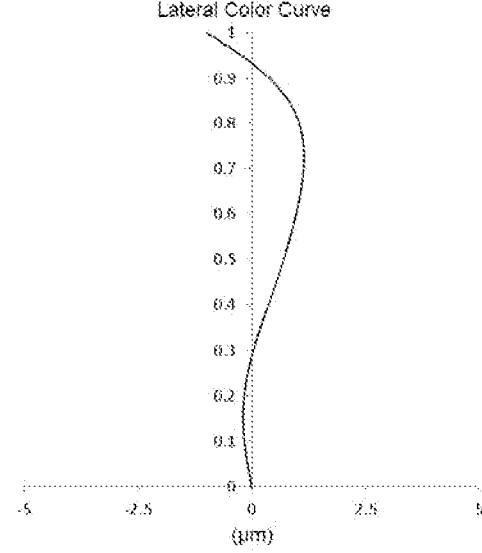

FIG. 8A illustrates a longitudinal aberration curve of the optical imaging lens assembly according to example 4, representing deviations of focal points of light of different wavelengths converged after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing the amounts of distortion corresponding to different image heights. FIG. 8D illustrates a lateral color curve of the optical imaging lens assembly according to example 4, representing the deviations of different image heights on an image plane after light passes through the lens assembly. It can be seen from FIG. 8A to FIG. 8D that the optical imaging lens assembly provided in example 4 can achieve good image quality.

Example 5

Figure 9:
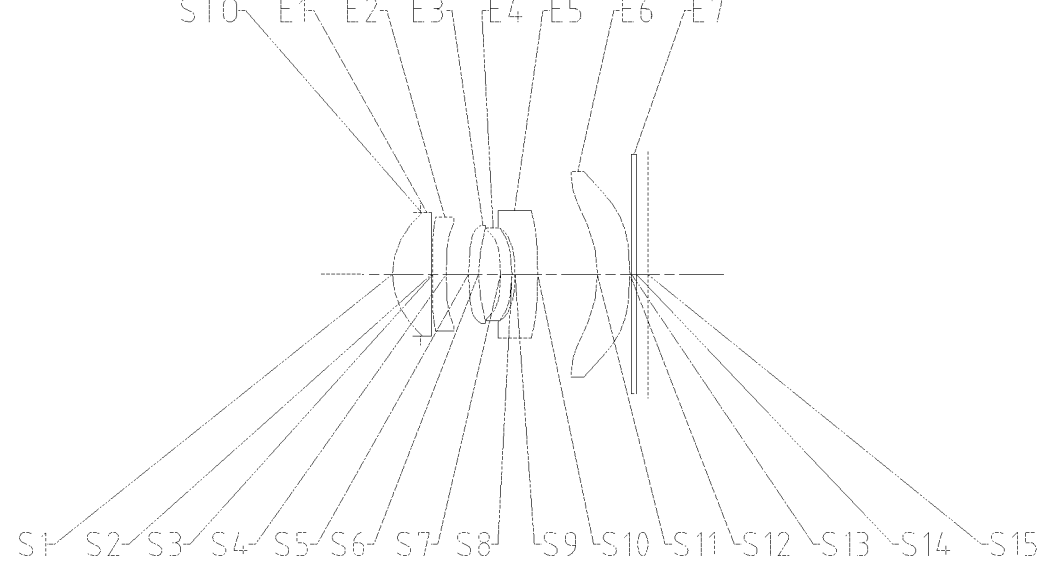
FIG. 9 illustrates a schematic structural diagram of an optical imaging lens assembly according to example 5 of the present disclosure.

An optical imaging lens assembly according to example 5 of the present disclosure is described below with reference to FIG. 9 to FIG. 10D. FIG. 9 illustrates a schematic structural diagram of the optical imaging lens assembly according to example 5 of the present disclosure.

As shown in FIG. 9, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is concave. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 9 shows the basic parameters of the optical imaging lens assembly of example 5, wherein the units for the radius of curvature and the thickness/distance are millimeter (mm). Table 10-1 and Table 10-2 show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 5, wherein the surface type of each aspheric surface may be defined by the formula (1) given in the above example 1.

TABLE 9

| Surface number | Surface type | Radius of curvature | Thickness/ Distance | Material Refractive index | Material Abbe number | Conic coefficient |
|---|---|---|---|---|---|---|
| OBJ | Spherical | Infinite | Infinite | | | |
| STO | Spherical | Infinite | −0.6420 | | | |
| S1 | Aspheric | 1.7070 | 0.8938 | 1.55 | 71.7 | −0.0453 |
| S2 | Aspheric | −20.1409 | 0.0320 | | | −84.8850 |
| S3 | Aspheric | −16.5446 | 0.3019 | 1.83 | 24.1 | −87.4796 |
| S4 | Aspheric | 10.0778 | 0.5079 | | | 34.5491 |
| S5 | Aspheric | 3.4729 | 0.2270 | 1.55 | 56.1 | 8.4541 |
| S6 | Aspheric | 2.2447 | 0.5067 | | | 2.3358 |
| S7 | Aspheric | −5.3291 | 0.2600 | 1.67 | 20.4 | 17.7201 |
| S8 | Aspheric | −3.1606 | 0.0736 | | | 0.1515 |

TABLE 9-continued

| Surface number | Surface type | Radius of curvature | Thickness/ Distance | Material | | Conic coefficient |
| | | | | Refractive index | Abbe number | |
| --- | --- | --- | --- | --- | --- | --- |
| S9 | Aspheric | −3.8231 | 0.5124 | 1.55 | 56.1 | 5.7360 |
| S10 | Aspheric | 201.1493 | 1.3683 | | | 90.0000 |
| S11 | Aspheric | −2.9584 | 0.7372 | 1.54 | 55.8 | −0.2215 |
| S12 | Aspheric | −8.0847 | 0.0398 | | | 9.9471 |
| S13 | Spherical | Infinite | 0.1100 | 1.52 | 64.2 | |
| S14 | Spherical | Infinite | 0.2626 | | | |
| S15 | Spherical | Infinite | | | | |

TABLE 10-1

| Surface number | $A_4$ | $A_6$ | $A_8$ | $A_{10}$ | $A_{12}$ |
| --- | --- | --- | --- | --- | --- |
| S1 | −3.0810E−02 | −8.7047E−03 | −1.6009E−03 | −5.3251E−05 | 1.2255E−04 |
| S2 | 2.9661E−02 | −2.5002E−03 | −3.9514E−04 | 7.3667E−04 | −8.0061E−05 |
| S3 | 7.7996E−02 | 3.8985E−03 | −1.9649E−03 | 4.1329E−04 | −1.3667E−04 |
| S4 | 6.3924E−02 | 8.7506E−03 | −2.1720E−03 | −2.9200E−04 | −1.6417E−04 |
| S5 | −7.8357E−02 | 2.9752E−02 | −2.8850E−03 | 3.9054E−04 | −8.7735E−05 |
| S6 | −1.5685E−01 | 1.8737E−02 | −2.2263E−03 | 2.2557E−04 | −2.0948E−04 |
| S7 | −1.3467E−01 | −2.1470E−02 | 2.0708E−03 | 1.0444E−03 | 3.7519E−04 |
| S8 | −8.2347E−02 | −1.7698E−02 | 6.5999E−03 | −1.0599E−04 | 3.2446E−04 |
| S9 | −1.1191E−01 | −8.1735E−03 | −3.8520E−04 | −2.4514E−03 | −4.1607E−04 |
| S10 | −1.2430E−01 | 1.9295E−02 | −4.0004E−03 | −5.3117E−04 | 2.0331E−04 |
| S11 | 2.3708E−01 | 9.7037E−02 | −1.2275E−02 | −1.4275E−03 | 3.1588E−03 |
| S12 | −6.6444E−01 | 1.1730E−01 | 1.0460E−02 | 4.4931E−03 | 1.6684E−03 |

TABLE 10-2

| Surface number | $A_{14}$ | $A_{16}$ | $A_{18}$ | $A_{20}$ |
| --- | --- | --- | --- | --- |
| S1 | 7.1410E−05 | 2.3944E−05 | 7.9505E−06 | 8.3415E−07 |
| S2 | 2.4590E−05 | −5.6120E−07 | −7.1965E−06 | 3.5671E−06 |
| S3 | 9.1433E−06 | −8.0821E−06 | −7.0382E−06 | 2.9291E−06 |
| S4 | −1.0001E−05 | −4.6561E−07 | 1.9952E−06 | 1.8578E−06 |
| S5 | −3.0315E−05 | −1.3372E−05 | −6.0648E−06 | −2.6494E−06 |
| S6 | −1.2108E−04 | −6.3119E−05 | −2.6225E−05 | −9.4875E−06 |
| S7 | 4.0035E−05 | −5.0568E−06 | −9.2764E−06 | 1.5813E−06 |
| S8 | 9.6082E−05 | 1.1748E−04 | 5.3864E−06 | 3.1304E−05 |
| S9 | −1.2613E−04 | 3.2296E−05 | −3.2705E−05 | 1.1195E−05 |
| S10 | 4.1385E−05 | −1.2561E−05 | −6.3067E−06 | 2.4339E−06 |
| S10 | 7.7062E−05 | −7.8284E−04 | 1.8825E−04 | 5.3065E−05 |
| S12 | 2.4710E−03 | −3.2692E−05 | 7.8175E−05 | −1.6041E−04 |

FIG. 10A illustrates a longitudinal aberration curve of the optical imaging lens assembly according to example 5, representing deviations of focal points of light of different wavelengths converged after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing the amounts of distortion corresponding to different image heights. FIG. 10D illustrates a lateral color curve of the optical imaging lens assembly according to example 5, representing the deviations of different image heights on an image plane after light passes through the lens assembly. It can be seen from FIG. 10A to FIG. 10D that the optical imaging lens assembly provided in example 5 can achieve good image quality.

Example 6

Figure 11:
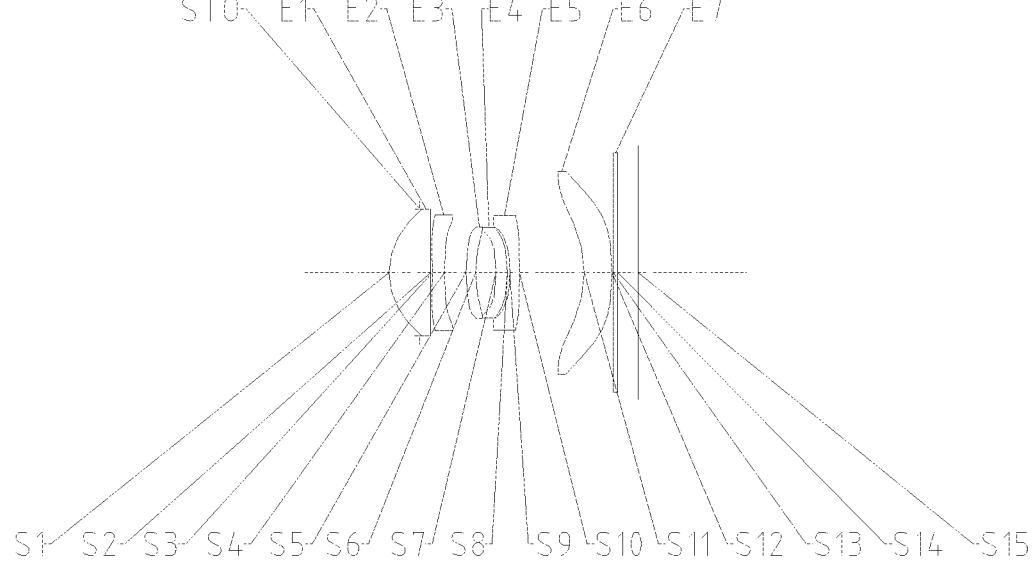
FIG. 11 illustrates a schematic structural diagram of an optical imaging lens assembly according to example 6 of the present disclosure.

An optical imaging lens assembly according to example 6 of the present disclosure is described below with reference to FIG. 11 to FIG. 12D. FIG. 11 illustrates a schematic structural diagram of the optical imaging lens assembly according to example 6 of the present disclosure.

As shown in FIG. 11, the optical imaging lens assembly includes, sequentially along an optical axis from an object side to an image side, a stop STO, a first lens E1, a second lens E2, a third lens E3, a fourth lens E4, a fifth lens E5, a sixth lens E6 and an optical filter E7.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is concave. The sixth lens E6 has negative refractive power, an object-side surface S11 thereof is concave, and an image-side surface S12 thereof is convex. The optical filter E7 has an object-side surface S13 and an image-side surface S14. The optical imaging lens assembly has an image plane S15, and light from an object sequentially passes through the respective surfaces S1 to S14 and finally forms an image on the image plane S15.

Table 11 shows the basic parameters of the optical imaging lens assembly of example 6, wherein the units for the radius of curvature and the thickness/distance are millimeter (mm). Table 12-1 and Table 12-2 show high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S12 in example 6, wherein the surface type of each aspheric surface may be defined by the formula (1) given in the above example 1.

TABLE 11

| Surface number | Surface type | Radius of curvature | Thickness/ Distance | Material Refractive index | Abbe number | Conic coefficient |
|---|---|---|---|---|---|---|
| OBJ | Spherical | Infinite | Infinite | | | |
| STO | Spherical | Infinite | −0.7101 | | | |
| S1 | Aspheric | 1.6707 | 0.9565 | 1.55 | 71.7 | −0.0453 |
| S2 | Aspheric | −30.1171 | 0.0392 | | | 47.6001 |
| S3 | Aspheric | −12.1954 | 0.2800 | 1.83 | 24.1 | −89.9999 |
| S4 | Aspheric | 12.2939 | 0.4892 | | | 74.1377 |
| S5 | Aspheric | 3.2996 | 0.2200 | 1.55 | 56.1 | 8.6425 |
| S6 | Aspheric | 2.2578 | 0.4681 | | | 2.5920 |
| S7 | Aspheric | −5.0577 | 0.2643 | 1.67 | 20.4 | 19.4595 |
| S8 | Aspheric | −2.8596 | 0.0552 | | | 0.3375 |
| S9 | Aspheric | −3.6592 | 0.2200 | 1.55 | 56.1 | 5.7740 |
| S10 | Aspheric | 17.4317 | 1.4848 | | | 30.1496 |
| S11 | Aspheric | −2.9372 | 0.6372 | 1.54 | 55.8 | −0.2181 |
| S12 | Aspheric | −8.0267 | 0.0300 | | | 10.3487 |
| S13 | Spherical | Infinite | 0.1100 | 1.52 | 64.2 | |
| S14 | Spherical | Infinite | 0.4600 | | | |
| S15 | Spherical | Infinite | | | | |

TABLE 12-1

| Surface number | $A_4$ | $A_6$ | $A_8$ | $A_{10}$ | $A_{12}$ |
|---|---|---|---|---|---|
| S1 | −2.8657E−02 | −8.8135E−03 | −2.3081E−03 | −5.0566E−04 | −6.8139E−05 |
| S2 | 2.5601E−02 | −3.2169E−03 | −3.7276E−04 | 3.7796E−04 | −1.3595E−04 |
| S3 | 7.6902E−02 | 3.4311E−03 | −1.2210E−03 | 2.8280E−04 | −1.5119E−04 |
| S4 | 6.4145E−02 | 7.6272E−03 | −1.5667E−03 | −1.8109E−04 | −1.2621E−04 |
| S5 | −7.2226E−02 | 2.7260E−02 | −4.0329E−03 | −3.9402E−04 | −6.6278E−04 |
| S6 | −1.4973E−01 | 1.9038E−02 | −1.6188E−03 | 6.2573E−04 | −3.1298E−04 |
| S7 | −1.4530E−01 | −2.0449E−02 | 3.4081E−03 | 1.9054E−03 | 7.0991E−04 |
| S8 | −7.9671E−02 | −2.0600E−02 | 9.1007E−03 | 2.3446E−04 | 1.2489E−03 |
| S9 | −1.0716E−01 | −1.1158E−02 | −1.7133E−03 | −4.0484E−03 | 1.7492E−04 |
| S10 | −1.0905E−01 | 2.0056E−02 | −5.9873E−03 | −2.5557E−04 | 4.8139E−04 |
| S11 | 2.1353E−01 | 1.0975E−01 | −2.2588E−02 | −4.7894E−03 | 3.9237E−03 |
| S12 | −6.6301E−01 | 1.3341E−01 | 8.1321E−03 | −1.4506E−03 | −6.0975E−05 |

TABLE 12-2

| Surface number | $A_{14}$ | $A_{16}$ | $A_{18}$ | $A_{20}$ |
|---|---|---|---|---|
| S1 | −4.1006E−07 | 1.6173E−05 | 2.5041E−07 | 3.3107E−06 |
| S2 | 2.1184E−04 | −1.1869E−04 | 3.3496E−05 | −3.4481E−06 |
| S3 | 1.6008E−04 | −8.4023E−05 | 1.9214E−05 | −2.1465E−06 |
| S4 | 2.2501E−05 | −1.5362E−05 | 5.0062E−06 | −5.5801E−07 |
| S5 | −4.1855E−04 | −2.2058E−04 | −9.6605E−05 | −2.8721E−05 |
| S6 | −3.5788E−04 | −2.5111E−04 | −1.0768E−04 | −3.8076E−05 |
| S7 | −2.0545E−05 | −1.0168E−04 | −5.9842E−05 | −8.1018E−06 |
| S8 | 1.3167E−04 | 7.9507E−05 | 1.0325E−05 | 3.8863E−05 |
| S9 | −2.2094E−04 | −3.8202E−05 | −3.5364E−05 | 2.6662E−05 |
| S10 | −8.5900E−05 | −7.0047E−06 | 5.7676E−06 | −8.1697E−07 |
| S11 | 5.9181E−04 | −4.2298E−04 | 1.1324E−04 | −2.3701E−05 |
| S12 | 1.5295E−03 | 7.6740E−04 | 6.6863E−04 | 2.5779E−04 |

FIG. 12A illustrates a longitudinal aberration curve of the optical imaging lens assembly according to example 6, representing deviations of focal points of light of different wavelengths converged after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing the amounts of distortion corresponding to different image heights. FIG. 12D illustrates a lateral color curve of the optical imaging lens assembly according to example 6, representing the deviations of different image heights on an image plane after light passes through the lens assembly. It can be seen from FIG. 12A to FIG. 12D that the optical imaging lens assembly provided in example 6 can achieve good image quality.

In addition, in examples 1 to 6, an effective focal length f of the optical imaging lens assembly, the focal length values f1 to f6 of each lens, a distance TTL along the optical axis from the object-side surface of the first lens to the image plane of the optical imaging lens assembly, half of a diagonal length ImgH of an effective pixel area on the image plane of the optical imaging lens assembly, half of a maximum field-of-view HFOV of the optical imaging lens assembly, and an F-number Fno of the optical imaging lens assembly are shown in Table 13.

TABLE 13

| Parameter/ Example | 1 | 2 | 3 | 4 | 5 | 6 |
|---|---|---|---|---|---|---|
| f (mm) | 6.48 | 6.51 | 6.37 | 6.52 | 6.37 | 6.57 |
| f1 (mm) | 2.82 | 2.83 | 2.88 | 2.86 | 2.88 | 2.88 |
| f2 (mm) | −7.06 | −7.15 | −7.54 | −7.45 | −7.53 | −7.36 |
| f3 (mm) | −15.83 | −14.95 | −12.22 | −13.43 | −12.44 | −14.15 |

TABLE 13-continued

| Parameter/ Example | 1 | 2 | 3 | 4 | 5 | 6 |
|---|---|---|---|---|---|---|
| f4 (mm) | 9.41 | 9.05 | 11.10 | 8.60 | 11.12 | 9.42 |
| f5 (mm) | −5.38 | −5.26 | −7.30 | −5.16 | −6.87 | −5.52 |
| f6 (mm) | −9.01 | −9.03 | −9.12 | −9.03 | −9.15 | −9.02 |
| TTL (mm) | 5.65 | 5.66 | 5.82 | 5.67 | 5.83 | 5.71 |
| ImgH (mm) | 2.85 | 2.85 | 2.80 | 2.85 | 2.80 | 2.88 |
| HFOV (°) | 23.5 | 23.5 | 23.5 | 23.5 | 23.5 | 23.5 |
| Fno | 2.45 | 2.45 | 2.45 | 2.45 | 2.30 | 2.30 |

The respective conditional expressions in examples 1 to 6 satisfy the conditions shown in Table 14, respectively.

TABLE 14

| Conditional/ Example | 1 | 2 | 3 | 4 | 5 | 6 |
|---|---|---|---|---|---|---|
| TTL/f | 0.87 | 0.87 | 0.91 | 0.87 | 0.92 | 0.87 |
| R2/R4 | −3.34 | −2.97 | −1.81 | −4.05 | −2.00 | −2.45 |
| R3/f2 | 3.11 | 2.40 | 1.92 | 3.08 | 2.20 | 1.66 |
| f/R1 + f/f1 | 6.24 | 6.24 | 5.94 | 6.23 | 5.94 | 6.21 |
| f3/(R5 + R6) | −2.73 | −2.61 | −2.18 | −2.38 | −2.18 | −2.55 |
| f4/(R7 + R8) | −1.31 | −1.37 | −1.33 | −1.12 | −1.31 | −1.19 |
| (f5 + R9)/f | −1.26 | −1.26 | −1.74 | −1.26 | −1.68 | −1.40 |
| f6/R12 + R11 | −1.80 | −1.81 | −1.81 | −1.82 | −1.83 | −1.81 |
| T23/T45 | 4.66 | 5.16 | 8.03 | 5.52 | 6.91 | 8.87 |
| T34/T45 | 4.75 | 5.21 | 7.37 | 5.55 | 6.89 | 8.49 |
| TTL/T56 | 3.58 | 3.54 | 4.02 | 3.50 | 4.26 | 3.85 |
| CT6/CT5 | 2.61 | 2.78 | 1.58 | 3.00 | 1.44 | 2.90 |
| DT11/DT32 | 1.32 | 1.34 | 1.32 | 1.34 | 1.35 | 1.48 |
| Fno/tan(HFOV) | 5.63 | 5.65 | 5.65 | 5.65 | 5.30 | 5.29 |
| R12/R11 | 2.72 | 2.72 | 2.72 | 2.74 | 2.73 | 2.73 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The inventive scope should also cover other technical solutions formed by any combinations of the above technical features or equivalent features thereof without departing from the inventive concept, such as, technical solutions formed by replacing the features as disclosed in the present disclosure with (but not limited to), technical features with similar functions.

What is claimed is:

1. An optical imaging lens assembly, comprising, sequentially along an optical axis from an object side to an image side:
    a stop;
    a first lens having positive refractive power;
    a second lens having negative refractive power;
    a third lens having negative refractive power;
    a fourth lens having positive refractive power;
    a fifth lens having negative refractive power; and
    a sixth lens having negative refractive power, and an image-side surface of the sixth lens is convex, wherein a number of lenses having refractive powers in the optical imaging lens assembly is six, the first lens to the sixth lens include two glass aspheric lenses, $4.5<T23/T45<9.0$, $−3.0<f3/(R5+R6)<−2.0$, and $TTL/f<1.0$,
    where T23 is a spaced interval between the second lens and the third lens along the optical axis, T45 is a spaced interval between the fourth lens and the fifth lens along the optical axis, f3 is an effective focal length of the third lens, R5 is a radius of curvature of an object-side surface of the third lens, R6 is a radius of curvature of an image-side surface of the third lens, TTL is a distance along the optical axis from an object-side surface of the first lens to an image plane of the optical imaging lens assembly, and f is an effective focal length of the optical imaging lens assembly.

2. The optical imaging lens assembly according to claim 1, wherein $−4.5<R2/R4<−1.5$,
    where R2 is a radius of curvature of an image-side surface of the first lens, and R4 is a radius of curvature of an image-side surface of the second lens.

3. The optical imaging lens assembly according to claim 1, wherein $1.5<R3/f2<3.5$,
    where R3 is a radius of curvature of an object-side surface of the second lens, and f2 is an effective focal length of the second lens.

4. The optical imaging lens assembly according to claim 1, wherein $5.5<f/R1+f/f1<6.5$,
    where R1 is a radius of curvature of the object-side surface of the first lens, and f1 is an effective focal length of the first lens.

5. The optical imaging lens assembly according to claim 1, wherein $−2.0<f4/(R7+R8)<−1.0$,
    where f4 is an effective focal length of the fourth lens, R7 is a radius of curvature of an object-side surface of the fourth lens, and R8 is a radius of curvature of an image-side surface of the fourth lens.

6. The optical imaging lens assembly according to claim 1, wherein $−2.0<(f5+R9)/f<−1.0$,
    where f5 is an effective focal length of the fifth lens, and R9 is a radius of curvature of an object-side surface of the fifth lens.

7. The optical imaging lens assembly according to claim 1, wherein $4.5<T34/T45<8.5$,
    where T34 is a spaced interval between the third lens and the fourth lens along the optical axis.

8. The optical imaging lens assembly according to claim 1, wherein $3.5≤TTL/T56<4.5$,
    where T56 is a spaced interval between the fifth lens and the sixth lens along the optical axis.

9. The optical imaging lens assembly according to claim 1, wherein $1.0<CT6/CT5≤3.0$,
    where CT6 is a center thickness of the sixth lens along the optical axis, and CT5 is a center thickness of the fifth lens along the optical axis.

10. The optical imaging lens assembly according to claim 1, wherein $1.0<DT11/DT32<1.5$,
    where DT11 is a maximum effective radius of the object-side surface of the first lens, and DT32 is a maximum effective radius of an image-side surface of the third lens.

11. The optical imaging lens assembly according to claim 1, wherein $5.0<Fno/tan(HFOV)<6.0$,
    where Fno is an F-number of the optical imaging lens assembly, and HFOV is half of a maximum field-of-view of the optical imaging lens assembly.

12. The optical imaging lens assembly according to claim 1, wherein $2.5 < R12/R11 < 3.0$, where R12 is a radius of curvature of the image-side surface of the sixth lens, and R11 is a radius of curvature of an object-side surface of the sixth lens.

13. An optical imaging lens assembly, sequentially along an optical axis from an object side to an image side of the optical imaging lens assembly, comprising:

a stop;

a first lens having positive refractive power;

a second lens having negative refractive power;

a third lens having negative refractive power;

a fourth lens having positive refractive power;

a fifth lens having negative refractive power; and a sixth lens having negative refractive power, and an image-side surface of the sixth lens is convex, wherein a number of lenses having refractive powers in the optical imaging lens assembly is six, the first lens to the sixth lens include two glass aspheric lenses, $4.5 < T23/T45 < 9.0$, $-3.0 < f3/(R5+R6) < -2.0$, and $1.5 < R3/f2 < 3.5$, where T23 is a spaced interval between the second lens and the third lens along the optical axis, T45 is a spaced interval between the fourth lens and the fifth lens along the optical axis, f3 is an effective focal length of the third lens, R5 is a radius of curvature of an object-side surface of the third lens, R6 is a radius of curvature of an image-side surface of the third lens, R3 is a radius of curvature of an object-side surface of the second lens, and f2 is an effective focal length of the second lens.

14. The optical imaging lens assembly according to claim 13, wherein $5.5 < f/R1+f/f1 < 6.5$, where f is an effective focal length of the optical imaging lens assembly, R1 is a radius of curvature of an object-side surface of the first lens, and f1 is an effective focal length of the first lens.

15. The optical imaging lens assembly according to claim 13, wherein $-2.0 < f4/(R7+R8) < -1.0$, where f4 is an effective focal length of the fourth lens, R7 is a radius of curvature of an object-side surface of the fourth lens, and R8 is a radius of curvature of an image-side surface of the fourth lens.

16. The optical imaging lens assembly according to claim 13, wherein $-2.0 < (f5+R9)/f < -1.0$, where f5 is an effective focal length of the fifth lens, R9 is a radius of curvature of an object-side surface of the fifth lens, and f is an effective focal length of the optical imaging lens assembly.

17. The optical imaging lens assembly according to claim 2, wherein $-4.5 < R2/R4 \leq -2.45$, $R2 < 0$, and $R4 > 0$.

18. The optical imaging lens assembly according to claim 5, wherein $-1.37 \leq f4/(R7+R8) < -1.0$.

19. The optical imaging lens assembly according to claim 8, wherein $3.5 \leq TTL/T56 \leq 4.26$.

20. The optical imaging lens assembly according to claim 9, wherein $1.44 \leq CT6/CT5 \leq 3.0$.

\* \* \* \* \*